United States Patent [19]

Staub

[11] Patent Number: 5,546,507

[45] Date of Patent: Aug. 13, 1996

[54] APPARATUS AND METHOD FOR GENERATING A KNOWLEDGE BASE

[75] Inventor: Wendy C. Staub, Strafford, Pa.

[73] Assignee: Unisys Corporation, Blue Bell, Pa.

[21] Appl. No.: 111,251

[22] Filed: Aug. 20, 1993

[51] Int. Cl.[6] ................................................ G06F 15/00
[52] U.S. Cl. ............................................. 395/76; 395/12
[58] Field of Search ................................. 395/76, 12, 51

[56] References Cited

U.S. PATENT DOCUMENTS

| | | | |
|---|---|---|---|
| 4,752,889 | 6/1988 | Rappaport et al. | 395/76 |
| 4,754,410 | 6/1988 | Leech et al. | 395/51 |
| 4,803,641 | 2/1989 | Hardy et al. | 364/513 |
| 4,891,766 | 1/1990 | Derr et al. | 395/76 |
| 5,107,497 | 4/1992 | Lirov et al. | 371/15.1 |
| 5,107,499 | 4/1992 | Lirov et al. | 371/15.1 |
| 5,119,318 | 6/1992 | Paradies et al. | 395/61 |
| 5,133,045 | 7/1992 | Gaither et al. | 395/51 |
| 5,140,671 | 8/1992 | Hayes et al. | 395/76 |
| 5,261,037 | 11/1993 | Tse et al. | 395/12 |
| 5,319,740 | 6/1994 | Yamada et al. | 395/76 |

OTHER PUBLICATIONS

Coffee et al., "Texas Instruments Inc. Personal Consultant Plus 4.0," PC Week, vol. 7, No. 8 (Feb. 1990), p. 87(2).
Software Product Specification, K–Base Builder (V.1.0), 1990.
Software Product Specification, K–Base Corporate (V.1.2), 1990.
Expert System resource Guide, Ginesys Corp.: the K–Base expert system development software package, AI Expert, vol. 7, No. 12 (Dec. 1992), p.44.
Software Product Specification, K–Base, 1993.
Software Product Specification, K–Vision, 1994.
CAM Software, Inc., Logic Tree, Software Product Specification, Released 1989.
Digital Equipment Corp., VAX Decision Expert, Software Product Specification, Released 1989.
Expert Edge Corp., Rocky (V.2.2), Software Product Specification, Released 1991.
Carnegie Group, Inc., Test Bench (v.2.2), Software Product Specification, Released 1992.
Cincom Systems, Inc., Xpert Rule, Software Product Specification, Released 1993.
Cincom Systems, Inc., Xpert Rule for Windows, Software Product Specification, Released 1993.
Stoddard et al., "Procedure Consultant: User–Friendly AI," AI Expert, Apr. 1989, 75–79.
Keyes, J., "Branching to the Right System: Decision–Tree Software" AI Expert, Feb. 1990, 61–64.
Nielsen, P., "Expert systems fortify applications; four packages that generate (code differ in design, ease of use and robustness," PC Week, Mar. 1991, 97(2).
Nielsen, P., "Atlas Software Ltd. Xpert Rule Proto Typer 4–2," PC Week, Mar. 1991, 98(2).
Murphy, T., "An Expert by the Rules," AI Expert, Jan 1993, 19(3).
Attar Software Limited, Xpert Rule for Windows, AI Expert, Jul. 1993, 55.
Quinlan, J. R., "Generating Production Rules from Decision Trees," IJCAI 87, Aug. 1987, 304–307.
Irani et al., "Applying Machine Learning to Semiconductor Manufacturing," IEEE Expert, Feb. 1993, 41–47.

*Primary Examiner*—Robert W. Downs
*Attorney, Agent, or Firm*—Robert R. Axenfeld; Mark T. Starr

[57] ABSTRACT

The present invention relates to a method and apparatus for automatically generating a knowledge base for use in an expert system. More specifically, the present invention discloses a method and system for automatically generating a knowledge base using a graphical programming environment to create a logical tree from which such a knowledge base may be generated. This enables a user of the present invention to author a knowledge base without knowledge of artificial intelligence specific languages and constructs. This is accomplished by permitting the user to construct a graphical picture that represents the problem solving knowledge about a given subject known as a decision tree, or logical tree. The arrangement of the graphical objects in the logical tree, along with the logical attachments associated with these objects, is used by the system employing the present invention to generate a knowledge base.

24 Claims, 29 Drawing Sheets

530  500   COMPONENT: [ATTRIBUTE/VALUE VIEW]

VIEW  COMPONENT  ATTRIBUTE  VALUE  540

| 510 COMPONENT NAME | PREVIEW |
|---|---|
| MOTHER BOARD | REFRESH |

| COMPONENT LIBRARY | |
|---|---|
| MOTHER BOARD<br>POWER SUPPLY<br>FAN<br>DISKETTE DRIVE<br>HARD DRIVE<br>TAPE DRIVE     520<br>BIOS | FOR THE SYSTEM MOTHER BOARD, WHAT IS THE CURRENT SETTING OF THE DIP SWITCH LOCATED AT THE REAR LEFT QUADRANT?<br>0110110<br>1101001<br>1110011     550<br>0001100 |

| ATTRIBUTES | POSSIBLE VALUES |
|---|---|
| INT  T/F  LIST  MULT | RECORDER  -  +  CANCEL |

| NAME | TYPE |   |   |
|---|---|---|---|
| 1 MHz | LIST | 1 | 0110110 |
| 2 COPROCESSOR PRESENT | T/F | 2 | 1101001 |
| 3 RAM | INT | 3 | 1110011 |
| 4 CACHE | INT | 4 | 0001100 |
| 5 CPU TYPE | LIST | 5 | |
| 6 LOCAL BUS | MULT | 6 | |
| 7 DIP SWITCH SETTING | LIST | 7 | |
|   |   | 8 | |

EDITOR: [ATTRIBUTE] [DIP SWITCH SETTING]

VIEW

| USER PROMPT | USER HELP |
|---|---|
| WHAT IS THE CURRENT SETTING OF THE DIP SWITCH LOCATED AT THE REAR LEFT QUADRANT? | TO LOCATE THE DIP SWITCHES, REMOVE THE COVER AND LOCATE THE SYSTEM FAN IN THE REAR LEFT QUADRANT OF THE CASE. THE DIP SWITCHES ARE LOCATED TO THE LEFT OF THE FAN, CLOSE TO THE REAR PANEL. |

FIG. 5

```
ERROR/WARNING MESSAGES
        CLOSE

BEGIN [KNOWLEDGE BASE GENERATION]
IN PROCEDURE [MAIN]:
  ERROR: THE FOLLOWING PATHS HAVE NO FORMULA:
    MAIN [ROOT]---->N2
    N1---->N3
    N1---->N4
IN PROCEDURE [SYSTEM BOARD DIAGNOSTICS]:
  ERROR: THE FOLLOWING TEST NODES HAVE NO
         PATHS:
    N5
    N6
  ERROR: THE FOLLOWING PATHS HAVE NO FORMULA:
    SYSTEM BOARD DIAGNOSTICS [ROOT]---->N2
    SYSTEM BOARD DIAGNOSTICS [ROOT]---->N1
    SYSTEM BOARD DIAGNOSTICS [ROOT]---->N4
    N1---->N5
    N1---->N6
IN PROCEDURE [ERROR MESSAGES]:
  ERROR: THE FOLLOWING TEST NODES HAVE NO
         PATHS:
    ERROR MESSAGES [ROOT]
IN PROCEDURE [PATTERN ANALYSIS]:
  ERROR: THE FOLLOWING TEST NODES HAVE NO
         PATHS:
    PATTERN ANALYSIS [ROOT]
WARNING: THE FOLLOWING PROCEDURES ARE NOT
         USED:
    PROCEDURE [MONITOR DIAGNOSTICS]
END [KNOWLEDGE BASE GENERATION]
```

FIG. 12

```
┌─────────────────────────────────────────────────────────────┐
│      EDS SELECTION:  [COMPONENT]  MOTHER BOARD              │
├─────────────────────────────────────────────────────────────┤
│           ACCEPT SELECTION AND CLOSE WINDOW                 │
│           CANCEL SELECTION AND CLOSE WINDOW                 │
│                                                             │
│                       DOCUMENTS                             │
│                                                             │
│  CTOS SYSTEM ADMINISTRATION GUIDE                           │
│  CTOS STATUS CODES REFERENCE MANUAL                         │
│  CTOS STATUS CODES: 0 - 11902                               │
│  AP1314/AP1354 PRINTER OPERATIONS & MAINTENANCE GUIDE       │
│  AP1327/AP1329 PRINTER INSTALLATION/OPERATIONS GUIDE        │
│  AP1327/AP1329 PLANNET DOCUMENTS                            │
│  AP1350-1/AP1351-1 PRINTER INSTALLATION/OPERATIONS GUIDE    │
│  CTOS B28/B38 WORKSTATIONS HARDWARE INSTALLATION GUIDE      │
│  B25/B28/B38/B39 SYSTEMS INSTALLATION GUIDE                 │
│ ┌─────────────────────────────────────────────────┐         │
│ │ PC/IT PERSONAL COMPUTER SYSTEM SERVICING GUIDE  │         │
│ └─────────────────────────────────────────────────┘         │
│  AP9215-1 PRINTER OPERATIONS/MAINTENANCE MANUAL             │
│      1310                                                   │
│                                                             │
│   FIRST      LAST      PAGE UP      PAGE DOWN               │
├─────────────────────────────────────────────────────────────┤
│                        TOPICS                               │
│                                                             │
│  REMOVING SYSTEM UNIT COVER  12-1                           │
│  REMOVING THE SPEAKER AND SWITCH ASSEMBLY  12-38            │
│  REMOVING THE SUBSYSTEM BOARD  12-28                        │
│  SYSTEM BOARD VOLTAGE TEST  4-10                            │
│  TABLE 4-1 SYSTEM BOARD VOLTAGE RANGES                      │
│  SYSTEM BOARD POWER CONNECTOR RESISTANCE TEST  4-13         │
│  TABLE 4-2 POWER CIRCUIT RESISTANCE VALUES                  │
│  INSTALLING THE SPEAKER AND SWITCH ASSEMBLY  12-44          │
│  REPLACING THE DISKETTE DRIVE  12-7                         │
│  REPLACING THE FIXED-DISK DRIVE  12-13                      │
│  REPLACING THE SYSTEM POWER SUPPLY  12-24                   │
│  REPLACING THE SYSTEM BOARD  12-30                          │
│  FIGURE 12-1                                                │
│                  1320                                       │
│   FIRST      LAST      PAGE UP      PAGE DOWN               │
└─────────────────────────────────────────────────────────────┘
```

FIG. 13

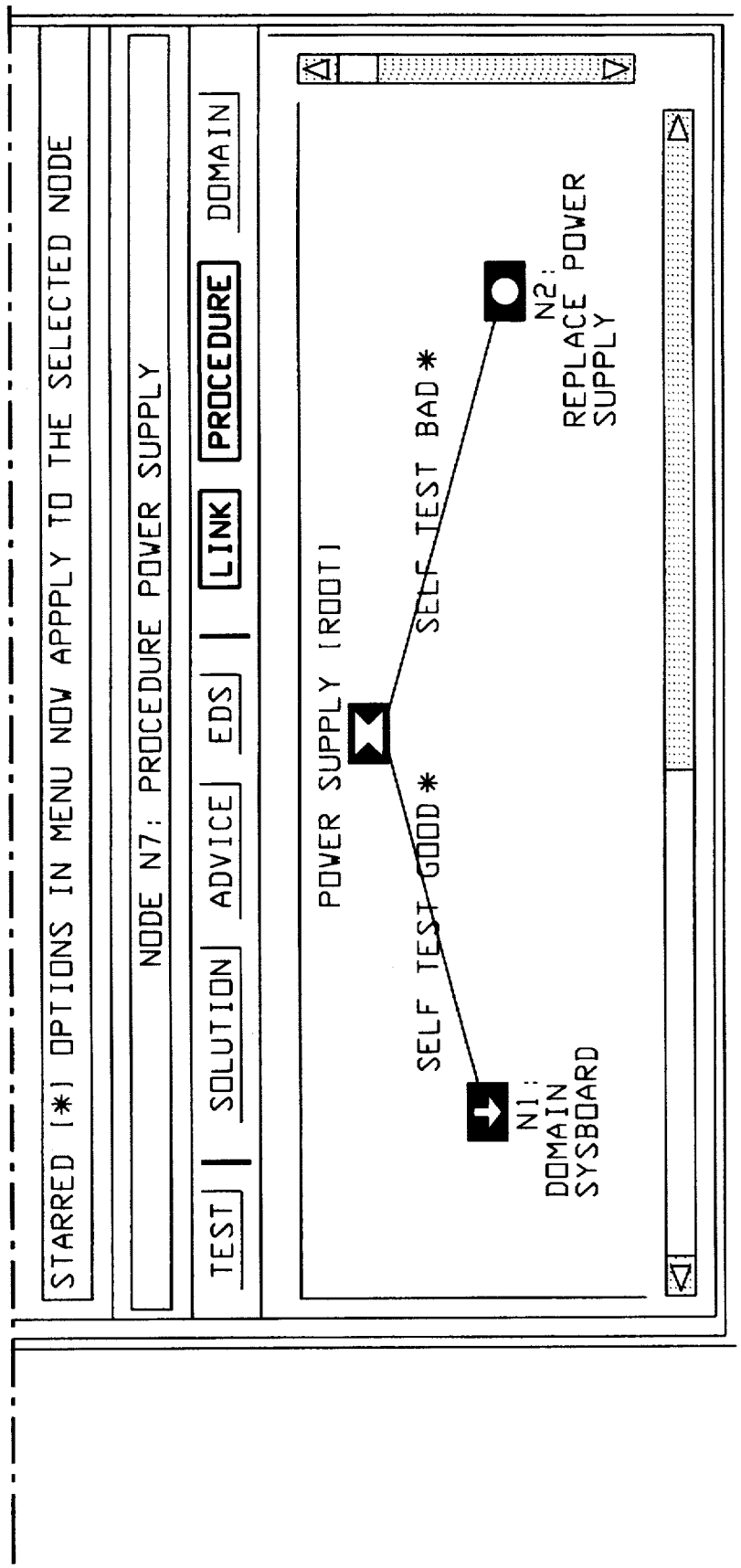
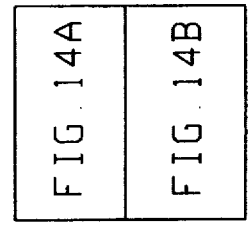
FIG. 14B
FIG. 14

KNOWLEDGE AUTHOR SCREEN

KNOWLEDGE AUTHOR CONTACT INFORMATION:

NAME: JOHN DOE

ADDRESS: MALVERN,PA USA

PHONE: 215-993-1111

CANCEL        ACCEPT ~2210

FIG. 22

APPARATUS AND METHOD FOR GENERATING A KNOWLEDGE BASE

FIELD OF THE INVENTION

The present invention relates generally to creating a knowledge base for use in an expert system. More specifically the present invention relates to systems for automatically generating a knowledge base using a graphical programming environment to create a logical tree from which such a knowledge base may be generated.

BACKGROUND OF THE INVENTION

Expert systems are known in the art to provide a means of making knowledge available to an expert system user by assisting in the analysis of a problem. An expert system is a computer program that imitates the behavior of a human expert. It uses information that the end user supplies to render an opinion on a subject based on the knowledge contained in its knowledge base.

Typically an expert system employs an inference engine to apply the knowledge of its knowledge base to the information supplied by the user. In this way the problem at hand is analyzed and a solution is recommended. This process often takes the form of a series of questions which the expert system asks and the user answers. The series of questions employed depends upon the user's answer to each question in the series.

When a user employs an expert system to solve a problem, a conclusion is derived by applying the facts and rules in the knowledge base to the information supplied by the user. In this sense, the expert system serves as an expert on a given subject to help a non-expert user derive a solution to the problem.

To construct an expert system one must put the relevant knowledge in a form which the expert system, and specifically the inference engine, may use. This usually involves transforming the knowledge about a specific subject into the form of facts and rules and storing the knowledge in the form of a computer data base. Presently, this involves a knowledge of artificial intelligence principles and programming skills such as those possessed by programmers using artificial intelligence specific languages like LISP or Prolog.

The construction of such an expert system usually involves the coding of appropriate prompts to the user to request and gather information. The task also involves adhering to the detailed syntax of the given artificial intelligence language to produce a compilable source. Unfortunately, the knowledge which one may wish to store as a knowledge base is not the exclusive domain of those with formal training in such programming skills. Even an expert in such languages frequently fails to produce and error free version of the code on first compilation.

Further once such systems are created, knowledge about the topic of the knowledge base may change. This requires that the knowledge base be updated. The individual who coded the expert system may not be immediately aware of such changes in the relevant field of expertise. This may cause some delay while experts in the field communicate their new information to the artificial intelligence programmer who will then code this new information in the knowledge base.

SUMMARY OF THE INVENTION

The present invention employs a graphical user interface to enable a user to author a knowledge base without knowledge of artificial intelligence specific languages and constructs. This is accomplished by permitting the user to construct a graphical picture that represents the problem solving knowledge about a given subject. This picture is known as a logical tree. The arrangement of the graphical objects in the logical tree, along with the logical attachments associated with these objects, is used by the system employing the present invention to generate a knowledge base.

It is a goal of the present invention to allow persons without formal training in artificial intelligence or computer programming to create a knowledge base quickly and easily.

It is another goal of the present invention to provide a system which generates a knowledge base from a graphical picture which represents the knowledge about the relevant subject.

It is a further goal of the present invention to generate a knowledge base correctly, such that a knowledge base language compiler will parse and compile the generated code correctly the first time. In this way the person developing the knowledge base need not debug the syntax of the knowledge base since the system generates the correct syntax automatically.

It is another goal of the present invention to provide a convenient interface which includes a graphical presentation such that developing the knowledge base is natural and easy to do.

In this respect, the graphical presentation permits the user to conceptualize the knowledge base at a much higher level than previously required to develop a knowledge base.

It is a further advantage of the present system that by permitting a user who is not formerly trained in artificial intelligence or computer programming to conveniently alter a knowledge base, that improvements or changes in the knowledge of the given field may be more quickly incorporated into the knowledge base employed.

BRIEF DESCRIPTION OF THE DRAWINGS

These and other aspects of the present invention will become apparent during the course of the following description and by reference to the accompanying drawings.

FIG. 5 illustrates the "Component" window of the preferred embodiment of the present invention.

FIG. 12 depicts an example of the "Error/Warning Message" window in the preferred embodiment of the present invention.

FIG. 13 depicts the electronic document selection (EDS) window used in the preferred embodiment of the present invention.

FIG. 22 illustrates the "Knowledge Author" window in the preferred embodiment of the present invention.

DETAILED DESCRIPTION OF THE INVENTION

Figure 1:
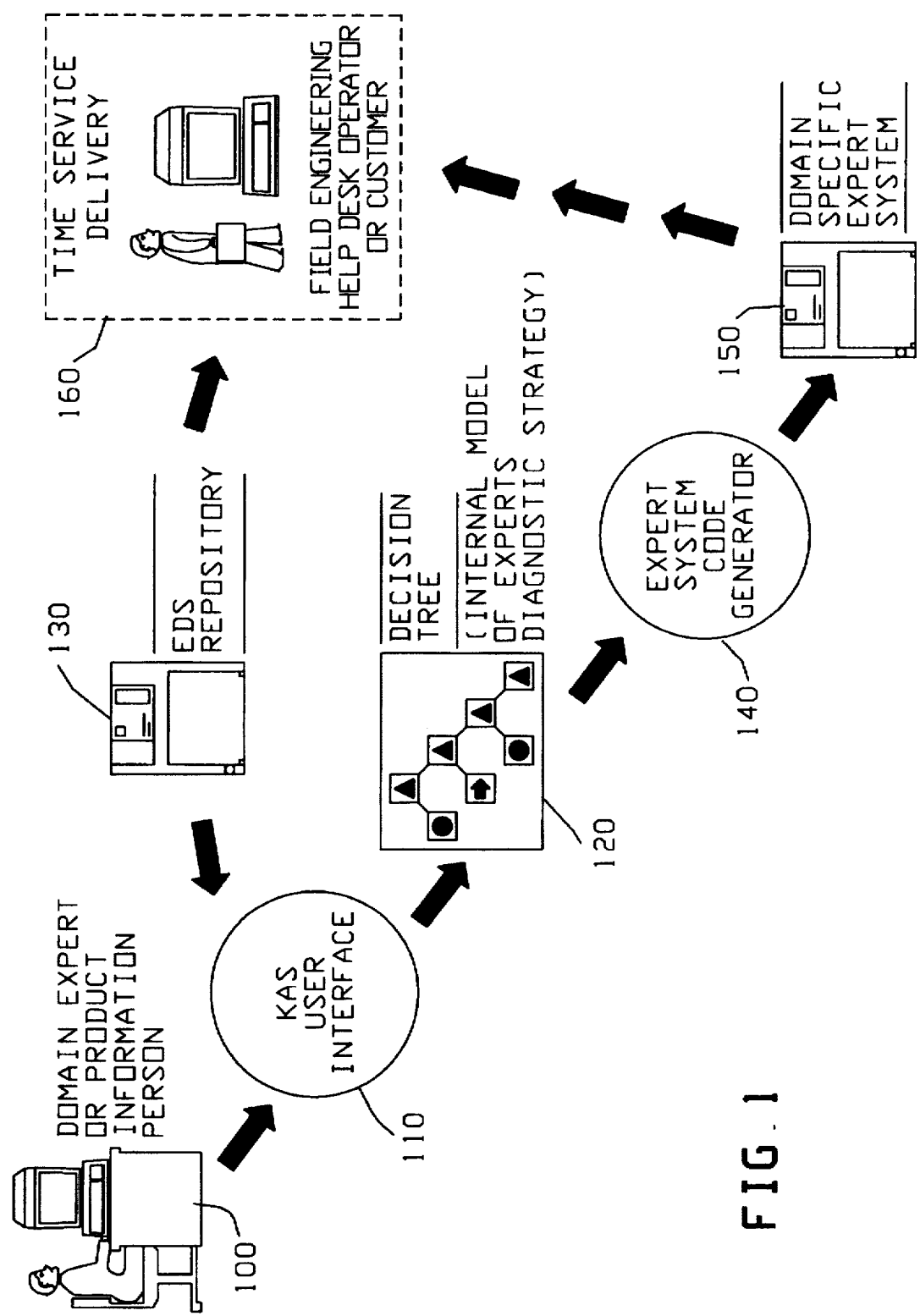
FIG. 1 depicts an overview of the use of the preferred embodiment of the present invention.

The present invention provides a window-based graphical interface to developing a knowledge base. FIG. 1 depicts an embodiment of the use of the present invention. An expert in the field of knowledge for which a knowledge base is to be constructed, uses the Knowledge Authoring System (KAS) interface 110 to construct a graphical representation of the knowledge base as a decision tree 120. In a preferred embodiment, this interface also provides a connection to a electronic document storage 130 which may be associated with the knowledge base.

The user, who is presumably an expert in the field for which the knowledge base is to be created, need not be an expert on artificial intelligence or computer programming. No knowledge of a specific programming language is required. Guided by the system of the present invention, the user builds the logical tree and enters the appropriate information for the nodes and path legs in the tree.

When the tree 120 is complete, the expert system code generator of the present invention 140 analyzes the nodes and legs in the tree, and the information associated with each these objects, to generate knowledge base code for a knowledge base 150. This knowledge base 150 may then be accessed by users 160 to take advantage of the expertise stored in the knowledge base.

Figure 2:
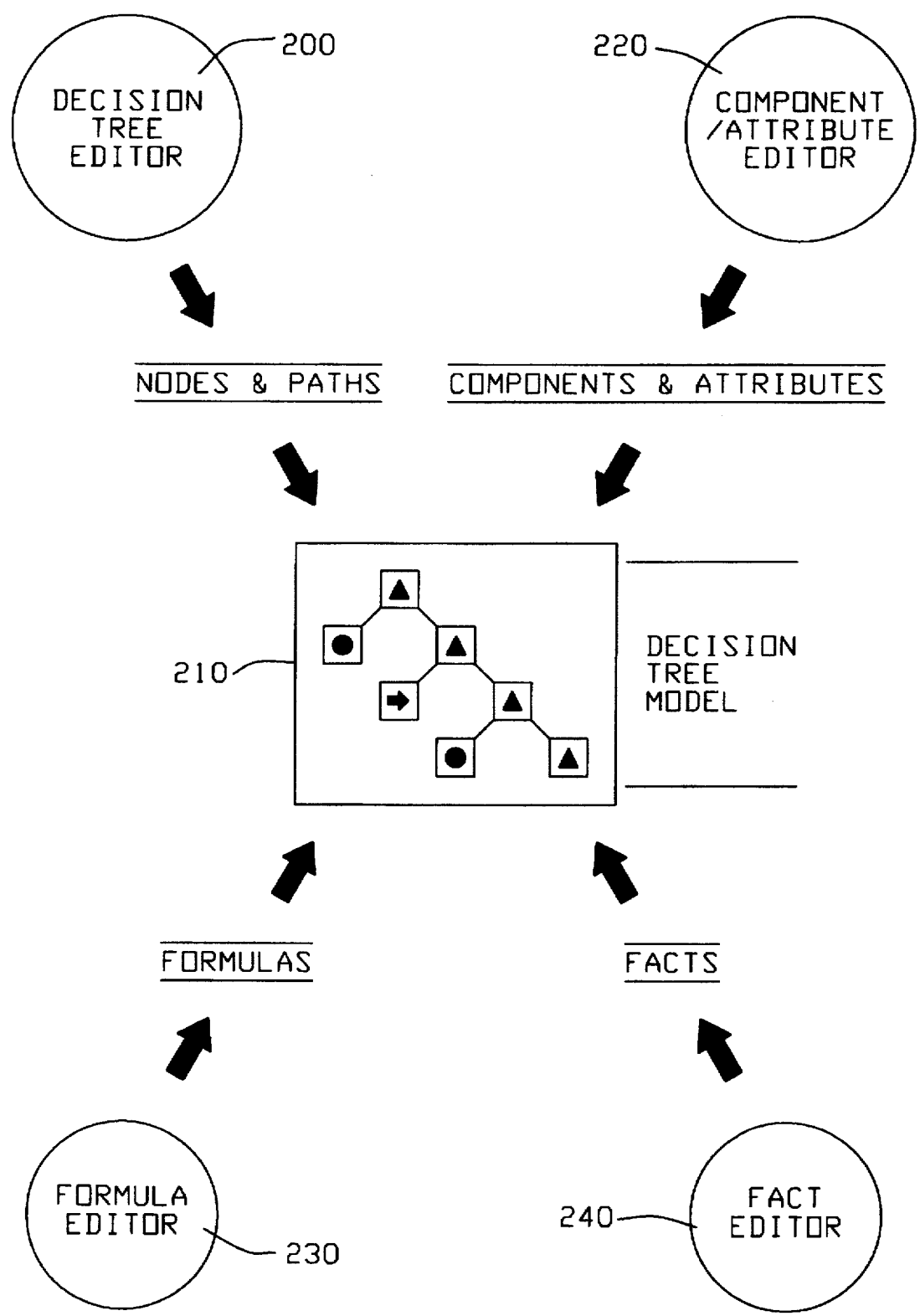
FIG. 2 illustrates the various editing elements that comprise the user interface for knowledge base construction for the preferred embodiment of the present invention.

As shown in FIG. 2, the user interface for knowledge base construction for the present invention includes several elements to provide editing functions. One such element is a decision tree editor 200 which permits the user to construct the graphical decision tree 210 which comprises nodes and path legs.

Another such element is the component and attribute editor 220. Components, as defined for the present invention, are objects that possess distinct characteristics and which are relevant to a specific domain. Components are defined by a unique name and a unique list of associated characteristics, also known as attributes. The attributes of a component are defined with a unique name and a list of associated values.

A simple example of a component and an attribute is that for a knowledge base regarding a printer domain. A "power cord", a "cable", and an "error code" may all be "components" of the printer domain. The component "power cord" may have attributes such as "plug status" and "wire type". Each attribute may have a limited set of valid values. The use and construction of components and attributes will be further described hereinafter.

The third element is the fact editor 240. The definition of fact, for the present invention, is a statement that needs no supporting evidence; it is true as stated. In the present invention, a fact is composed of an attribute, an operator, and a value. The operator states the relationship between the attribute and the value. Facts are used to define a formula.

After a user defines an attribute and identifies its type and possible values, a user may then create facts about the attributes. Having created a fact and attributes, one may then create a path leg formula.

Formula editor 230 provides the user a means of entering and editing information related to formulas for the present invention. A formula, as defined for the present invention, is a logical expression that evaluates to a value of "true" or "false". A formula is constructed in the present invention by selecting the desired facts from the fact library and combining them with logical operators from within the "Path" window of the formula editor 230. Since only valid facts and operators may be selected, the editor will only permit valid formulas to be constructed.

In the present invention, a formula is the logical expression of one or more facts connected by logical operators, such as, AND or OR. A formula is associated with a specific path leg and is evaluated by the resulting expert system to a value of "True" or "False". If the formula is evaluated to "True", the associated path leg is accepted. Conversely, if the evaluation yields "False", then the associated path leg is rejected.

Figure 2A:
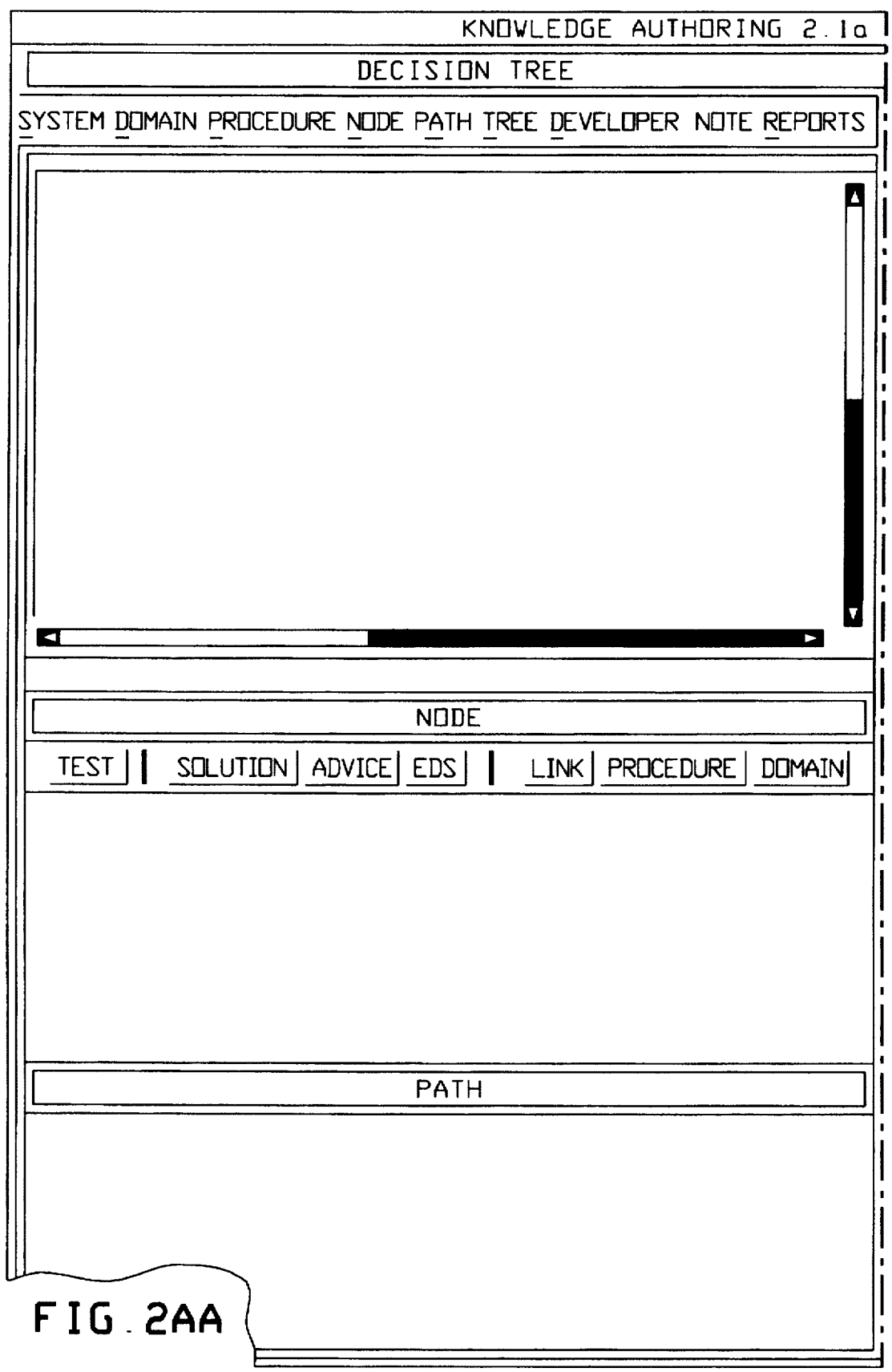
FIG. 2A illustrates the appearance of the user interface in the preferred embodiment of the present invention.
Figure 2A:
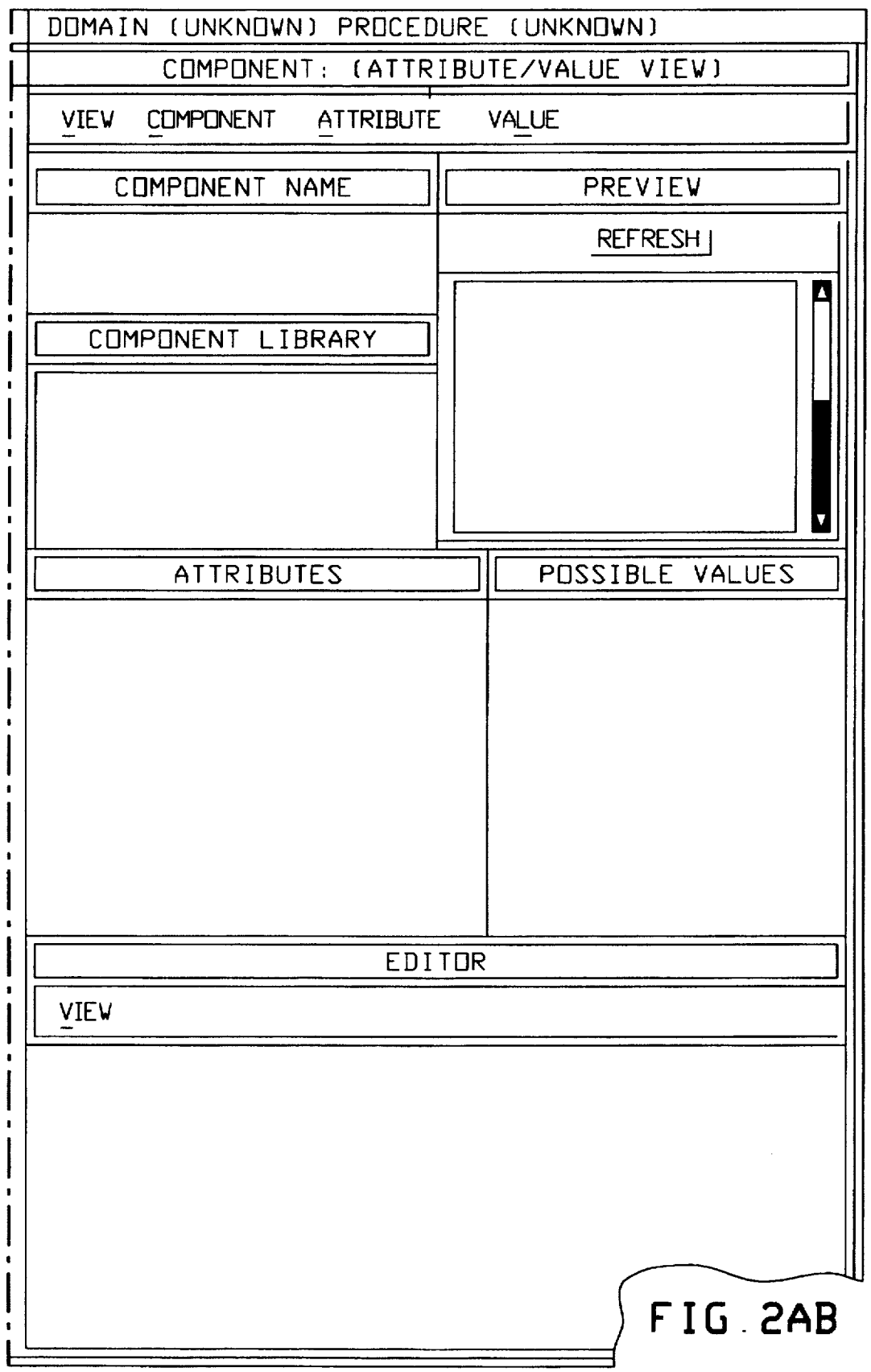

FIG. 2A depicts the appearance of the user interface for the construction a knowledge base in the preferred embodiment of the present invention. A description of some of the windows which comprise this user interface follows.

Figure 3:
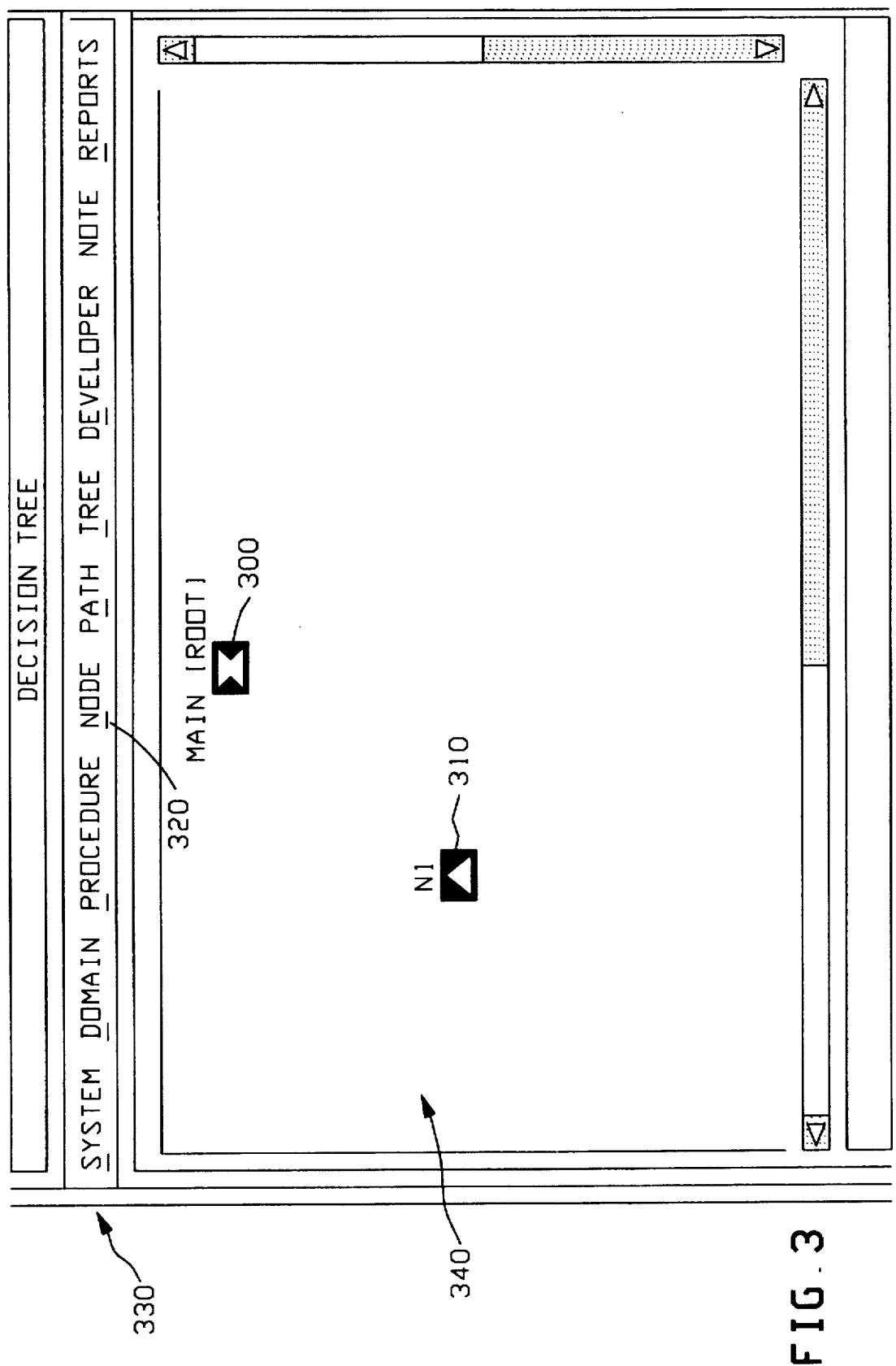
FIG. 3 depicts the nodes of a decision tree under construction as when the user is in the "Decision Tree" window of the preferred embodiment of the present invention.

FIG. 3 depicts nodes of a decision tree as when the user is in the "Decision Tree" window of the preferred embodiment of the present invention. A decision tree, in the present invention, is a graphical representation of the alternatives that a user may encounter in a decision making process.

A knowledge base is created to address an overall system, or domain. Within each domain there are one or more procedures. Each procedure is associated with a single decision tree. When constructing a knowledge base, the expert constructs a graphical decision tree which reflects the knowledge to be stored in the knowledge base.

In the preferred embodiment of the present invention, the decision tree editor may be used to create a node, define a node type, move a plurality of nodes, delete a plurality of nodes, and reconnect a path leg to a node. The preferred embodiment of the present invention also provides a means to define a leg, to connect a leg, and to delete a leg.

As defined in the present invention, a node is a discrete point in a decision tree. A node may represent a junction where a decision is made, a possible goal in the decision process, or a connection to another node not included in the present decision tree. Each node of the tree is connected to at least one other node by a path leg.

Creating a node is the first step in constructing a basic representation of the decision tree. After creating a node in the present invention, the node may be defined. The system of the present invention uses the node and the associated definition when the decision tree is compiled into a knowledge base.

A node called a "root" node 300 is the first node displayed in the "Decision Tree" window when a new procedure is defined. This is the parent node for the new decision tree.

As an example of one of these functions, a description of the procedure to create a node will now be presented. First the "Node" selection 320 from the "Decision Tree" window menu bar 330 is selected by the user. This causes the node menu to be displayed. The action "Create Node" is then selected by the user. In the preferred embodiment, a cross-hair indicator is then displayed on the window 340 which permits the user to position the location of the node to be created.

Once the cross-hair is correctly positioned, the user causes the creation to occur by clicking with the mouse. This causes a test node icon 310 to appear. In the preferred embodiment, all nodes are created as test nodes. Test nodes represent a node where a decision or test takes place. Once created, the node may be redefined as appropriate.

In the preferred embodiment, each node is assigned a system generated number when it is created. These numbers do not change when the nodes are moved. Such numbers simplify identifying nodes within the system.

In the preferred embodiment, there are three types of nodes: test, solution, and link. A solution node represents a leaf, or terminating, node in the decision tree. A solution node contains a solution to a problem which may include a reference to an electronic document.

To define a solution node in the preferred embodiment of the present invention, the user moves the cursor to the node to be defined and clicks with the mouse. The node color changes to indicate it has been selected. At the same time the contents of the appropriate "Node" window 1000 in FIGS. 10A-E appear. The user moves the cursor to the solution button 1010 in the "Node" window 1000 and clicks. The node icon changes to represent a solution node and the contents of the "Node" window change to that for a solution node as shown in FIG. 10B.

Figure 10A:
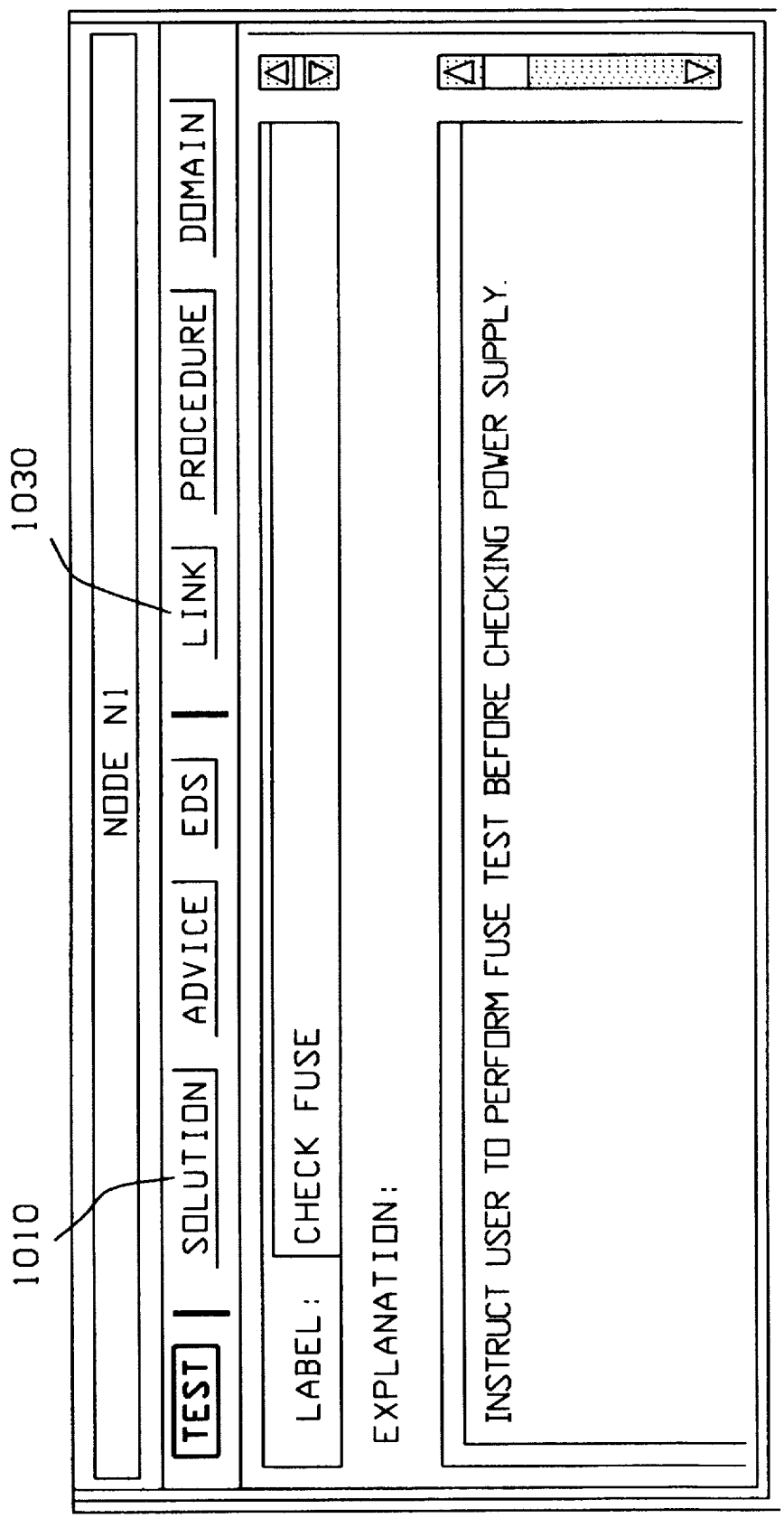
FIG. 10A–E show various views of the "Node" window in the preferred embodiment of the present invention.
Figure 10B:
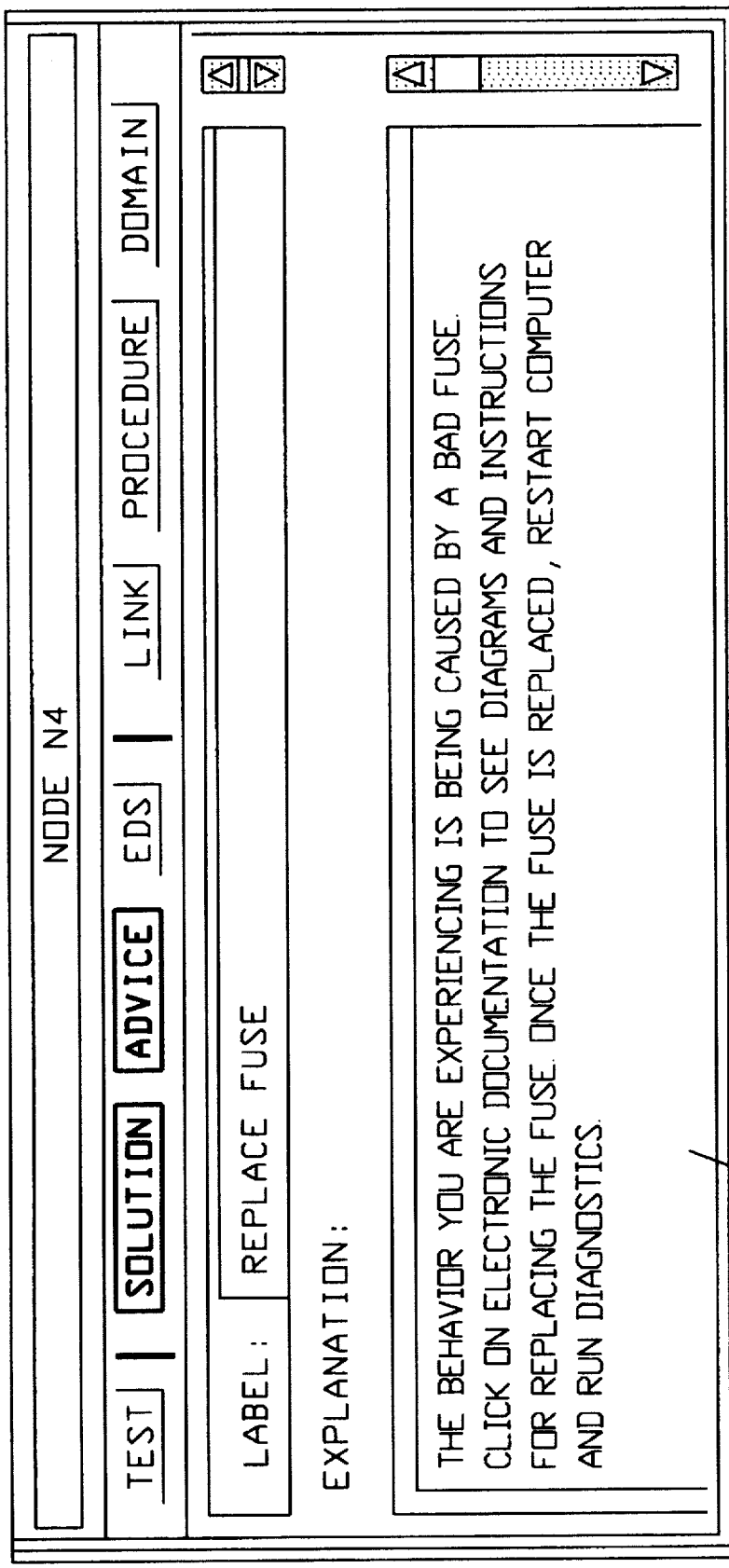

The user may enter an explanation note for reference by the eventual end user in the window of FIG. 10B. This explanation note will be seen by the end user and may comprise a clear, concise statement of the problem and the solution and may include attaching to the solution node an electronic document reference.

Figure 10C:
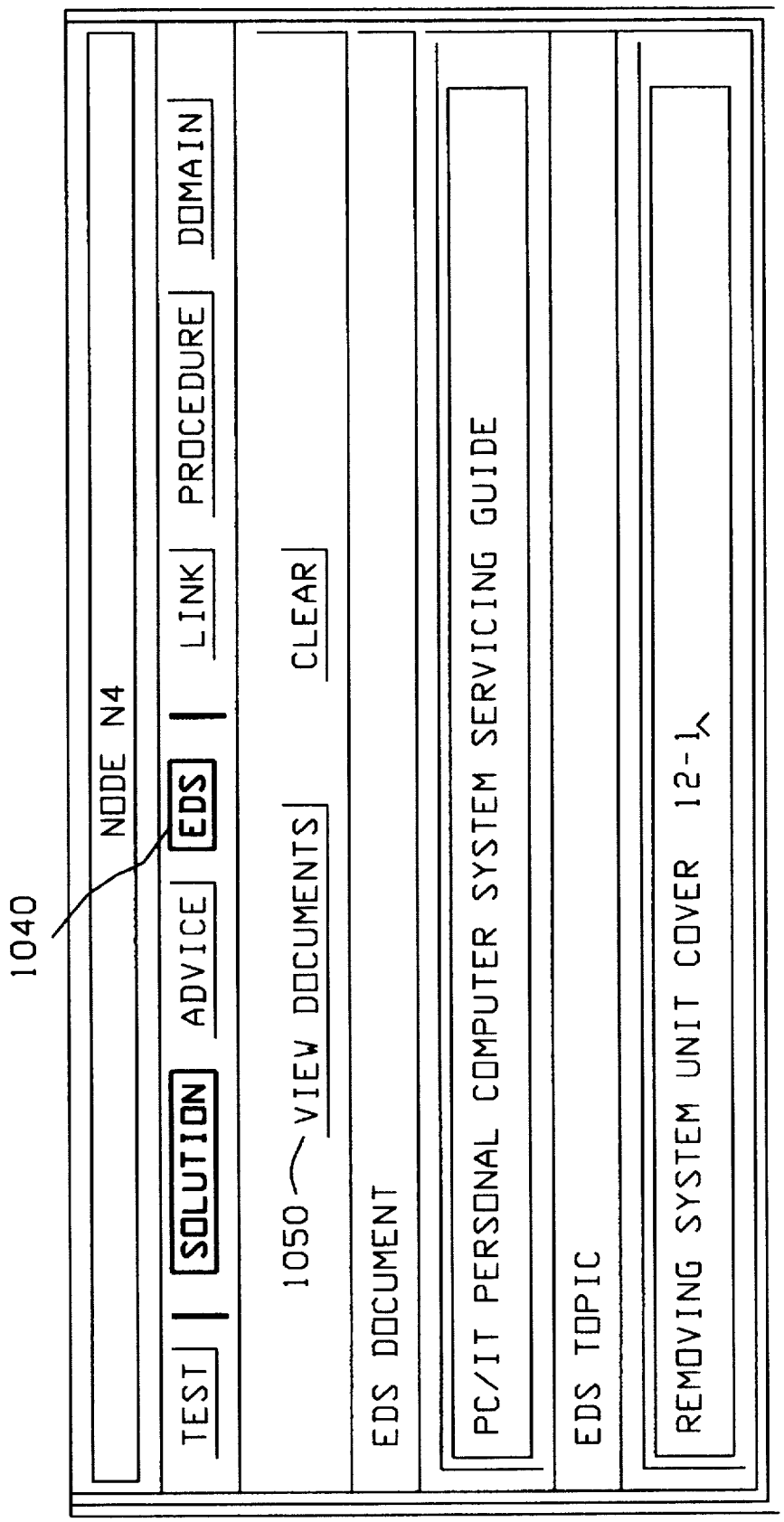

To attach an EDS reference to a solution node, the user selects the "EDS" button 1040 causing the window of FIG. 10C to appear. Selecting the "View Documents" button causes the EDS document window shown in FIG. 13 to appear. A document may be associated with a given object by selecting a document from the upper window 1310 and selecting a topic from one of the topics that appear in the lower window 1320.

A link node represents a connection to another domain or to a procedure within the same domain. The method for defining a link node is similar to that for the solution node described above. The user selects the "Link" button 1030 in the "Node" window 1000. If no further action is taken, the node acts as a "stub" until it is associated with a procedure or domain.

Figure 10D:
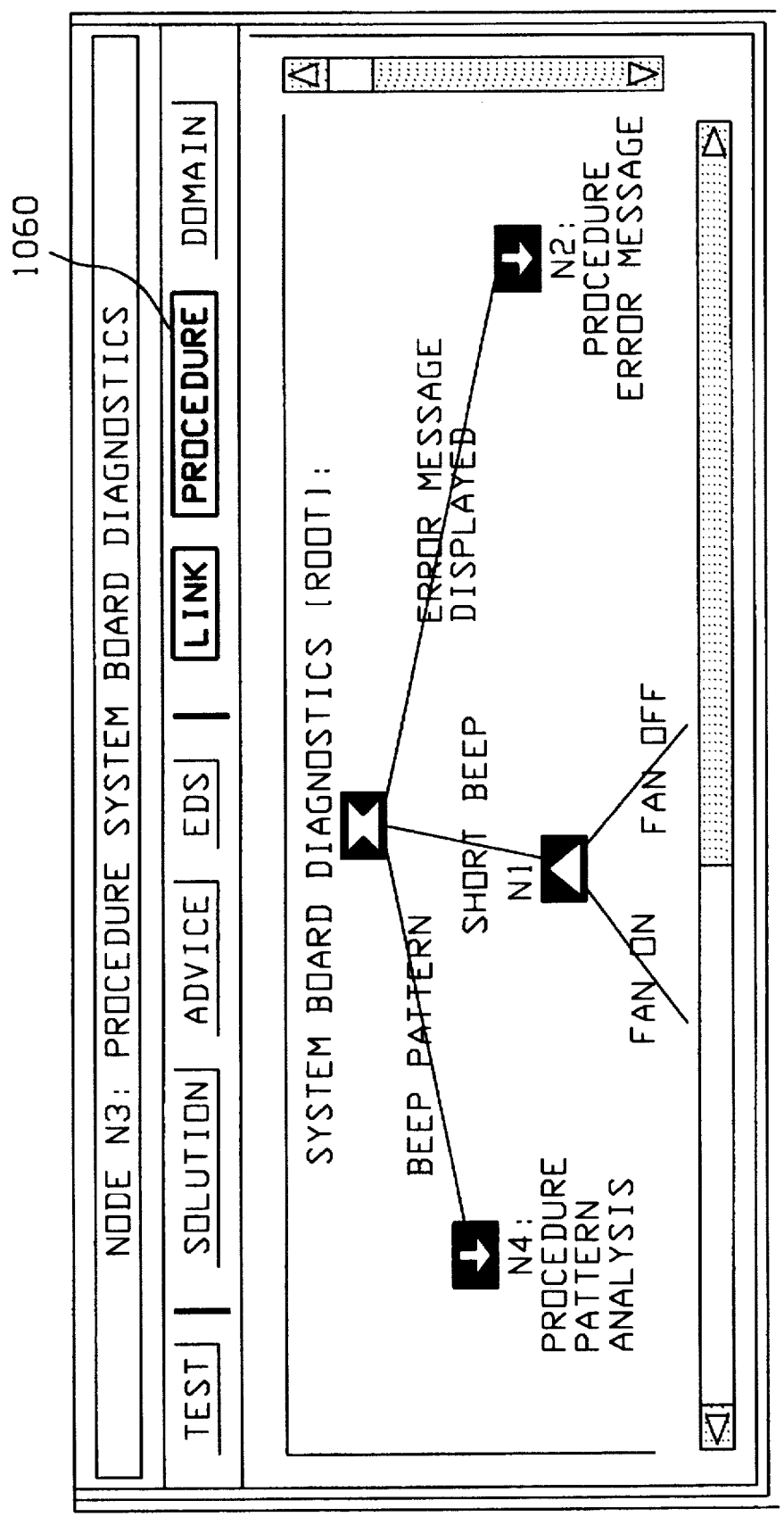

If the "Procedure" button 1060 is selected and previously defined procedures exist within the current domain, a list of these procedures is displayed. The user may then select the procedure from the list to which the link node is to connect. The associated decision tree for the selected procedure appears in the node window as shown in FIG. 10D.

Figure 10E:
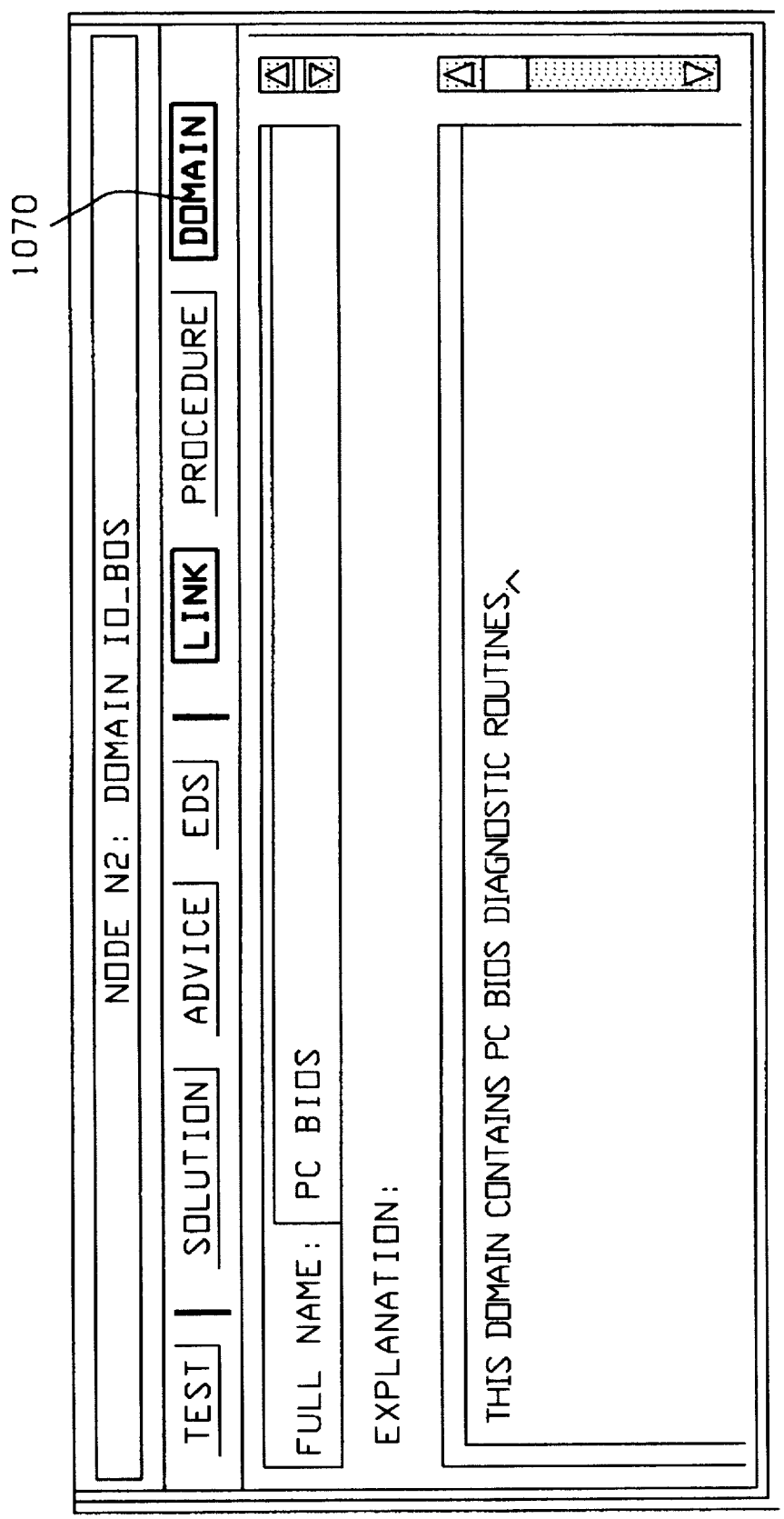

Similarly, if the "Domain" button 1070 is selected and previously defined domains exist within the user's system, a list of these domains is displayed. The user may then select a domain from the list to which the link node is to connect. The user may also enter the name of a domain which is not yet defined or which may exist on a different system. Once a domain is specified, information about that domain appears in the node window as shown in FIG. 10E.

A node may be connected to another node by creating a path leg between the nodes and associating a formula with the path leg. To do so, the user first selects one of the nodes as the parent node. The parent is the uppermost of the two nodes to be connected. The user then chooses the "Node" selection from the "Decision Tree" window menu bar 330 which causes the "Node" menu to be displayed. Next, the user selects "Connect Nodes" which causes a cross-hair to be displayed. The user moves the cross-hair to the node to which to connect the path leg and selects it. This causes a line or leg to be displayed between the two nodes.

Other node oriented actions may be performed in a similar manner. For instance, a single node or a group of nodes may be selected and moved with the "Move Node" choice in the node menu. The "Reconnect" choice permits a user to change a path leg connection from one node to another. This action involves selecting a node from which the path leg should be disconnected and selecting the new node to which the path leg should be connected. Other actions include the capability to delete a path leg and to delete a node. Those skilled in the art will recognize how those actions are accomplished having read the description above.

When nodes are connected, a relationship must be established between the nodes using a formula. A formula is comprised of one or more facts. Facts are attributes and values related by operators. In the preferred embodiment, a formula is constructed using the "Path" window 900, facts are constructed using the "Fact" window 800, and attributes and values are created using the "Component" window 510.

Figures 2A, 6, 7A:
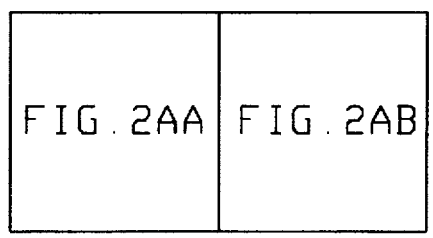
FIG. 6 illustrates the "Attribute" window of the preferred embodiment of the present invention.
FIG. 7A shows the "Numeric Constraints" window for the preferred embodiment of the present invention.

With reference now to FIG. 5, to construct a component in the preferred embodiment of the present invention, the user selects the component menu selection 500 from the "Component" window menu bar 540. This causes the component menu to be displayed. The user then chooses 'Create New Component' which causes a component name entry box to display. The user then enters the name of the component to be defined. The system of the preferred embodiment adds the component name to the component library window 520 and displays the "Attribute" window 600 as shown in FIG. 6 to permit the user to define the attributes for this component.

In the preferred embodiment of the present invention each component may have multiple attributes. Defining an attribute consists of naming the attribute, assigning an attribute type, and, in some cases, defining a set of possible values. In the preferred embodiment the three possible attribute types are truth, list, and numeric integer.

A truth attribute may take a value of true or false. For example, for a component named "status light" a user might define a truth attribute named "power on", where "power on" may assume a value of true or false.

A list attribute is one which may assume one of a set of values in a list. For example, a component named "warning light" might have a list attribute named "color" that may assume one of the list of values "red", "green", or "yellow".

A multiple list attribute is a variation of a list attribute which may assume one or more possible values simultaneously. For example, a component named "printer" might have a multiple list attribute named "problem type" that may assume one or more values such as "print quality", "skipping pages", and "jammed". Hereinafter, the term list attribute will encompass both a single value list attribute and a multiple value list attribute.

In the preferred embodiment, a numeric attribute assumes a value of an integer. In an alternative embodiment other numeric values may be favorably employed. Optionally, a user may even specify mathematical constraints when defining numeric values. Constraints are the restrictions or limits that are placed on a value that is entered by the user.

In the preferred embodiment there are five types of constraints, each represented by mathematical symbol. These symbols are $>$, $<$, $\geq$, $\leq$, and $\neq$. These symbols may be used to define a range of values permissible for the given attribute. For example, if a printer works best while running between 65° and 75° Fahrenheit, the user could express the constraint for the attribute temperature as $\geq 65$ $\leq 75$.

An example of creating a numeric attribute will now be presented. Those skilled in the art will recognize that list and truth attributes may be similarly created. In the "Attribute" window 600 for a given component shown in FIG. 6, type the name of the attribute to be created on the first available numbered line. Move the cursor to the numbered selector button to the left of the name and click or select that button. This causes the attribute name to be highlighted.

Select the 'INT' button 610 from the list of attribute types at the top of the window. The letters 'INT' are then displayed next to the attribute name and the "Numeric Constraints" window 700, shown in FIG. 7A, is now displayed. Move the cursor to the "Numeric Constraints" window and type the numeric constraints associated with the attribute being created in the given field.

Figure 7B:
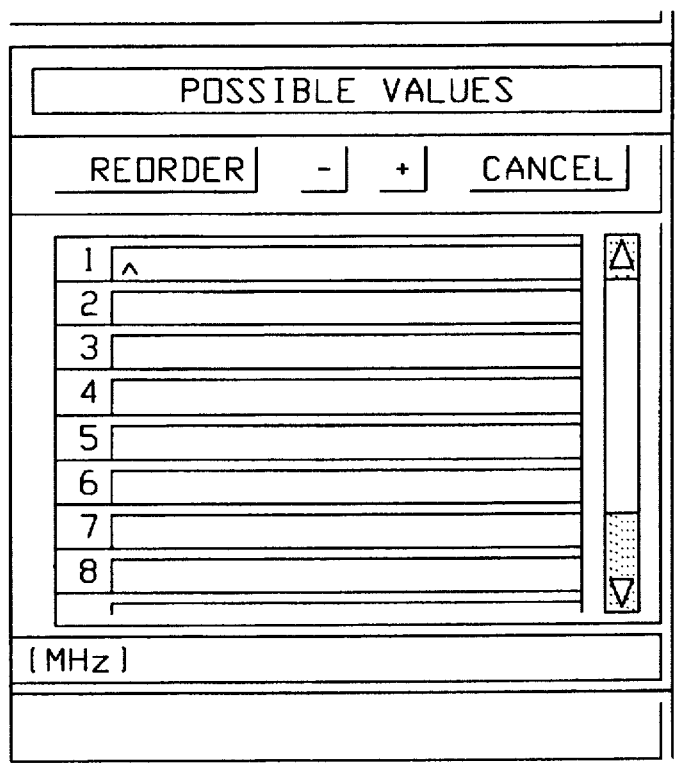
FIGS. 7B and 7C show the windows employed in the preferred embodiment of the present invention for creating list and truth attributes respectively.
Figure 7C:
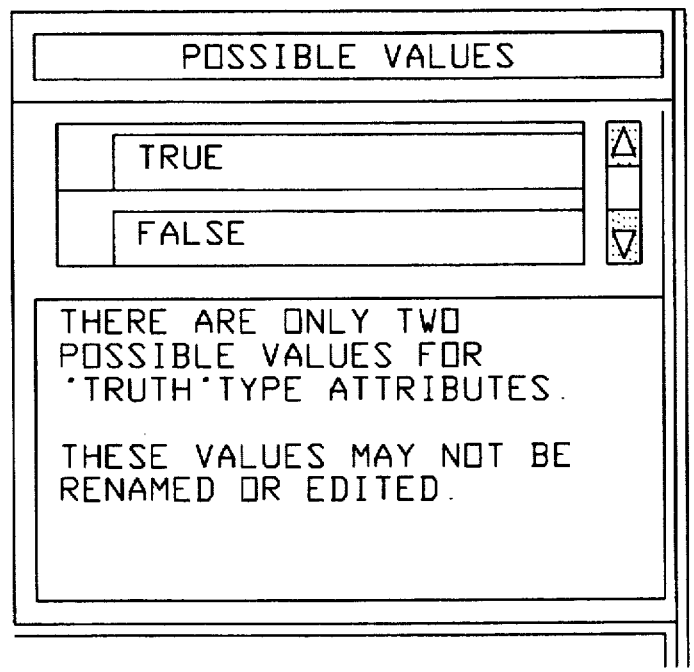

The windows employed in the preferred embodiment of the present invention to create list and truth attributes are shown in FIGS. 7B and 7C respectively.

In the preferred embodiment, all of the components associated with a given domain are stored in a component library for that domain. All of the attributes and values the user defines for a component, along with the user prompts, user help, and electronic documentation attachments are also stored in the component library. These components may be reused in different procedures within a single domain.

To reuse a component from the component library, move the cursor to the "Component Library" window 520 and select the component to be reused. The component will then be displayed in the component name box along with all its associated attributes and values. Editing may proceed from this point as before.

Like most expert systems, a knowledge base uses an inference engine or program to diagnose and solve problems. The inference engine uses artificial intelligence techniques to derive conclusions based upon the rules stored in the knowledge base. When an inference engine attempts to solve a problem, it searches through the knowledge base, using the rules contained in the knowledge base, as well as input from the user, to evaluate conditions until it arrives at an appropriate solution.

For an inference engine to correctly diagnose the problem, the rules contained in the knowledge base must be of a logical form and able to be tested. In the preferred embodiment of the present invention, these diagnostic rules are derived from formulas defined by the user. A formula is a logical expression that can be tested and evaluated to a true or false result.

In a decision tree employed in the present invention, a user associates a formula with each path leg in the tree. The decision tree may then be compiled by the system of the present invention into a knowledge base for use by an inference engine.

A formula is composed of one or more facts. A fact is a statement about an attribute and one or more of its possible values. For example, "status code=5", "voltage $\geq 110$", and "temperature <21" are all examples of facts. Facts employing list attributes may employ logical connectors to define the list attribute fact. For example, a fact employing a multiple list attribute would use the logical connector "&". For instance, "problem type=print quality & skipping pages" is a valid fact employing a multiple list attribute. When the inference engine tests a formula, it is really testing the truth or falsehood of each of the facts that make up the formula.

In the preferred embodiment of the present invention there are two types of formulas; single fact and multiple fact. A single fact formula is comprised of a single fact and the inference engine need only evaluate that fact.

A formula that contains more than one fact is a multiple fact formula. In the preferred embodiment, facts in a multiple fact formula are connected by logical operators "AND" or "OR" and may contain parentheses. The logical operator "OR" has precedence over the operator "AND" but parentheses may be used to override this precedence order.

When the inference engine evaluates a multiple fact formula in the preferred embodiment, it evaluates the least number of facts necessary to prove a formula either true or false in its entirety. The engine evaluates the formulas in a left to right direction as the associated formula appears in the display.

For example, the following formula was defined for a path leg:

(Code=1 AND Fuse≠GOOD) OR Switch=OFF.

If the user responds that the code has a value of 1 and that the fuse is burned out or "not good", then the formula evaluates to true. No further questions need be answered since a resolution to the formula has been achieved.

If the user responds that the code displayed is 2, the next question asked would be if the switch is on or off. Since the expression enclosed in parentheses could not be true when the Code=2, there is no need to ask if the fuse is good or bad.

Facts used in a formula must be defined before the formula may be constructed. Facts are defined about attributes and are composed of the attribute name, an operator, and one or more values. The operator states a relationship between the attribute and the values. In the example above, one of the attributes was "Code", the operator was the "=" sign and the value was 1.

A single attribute may have multiple facts defined in the present invention. In the above example, the attribute "Fuse" may have several values; e.g., Fuse=Good, Fuse=Bad, Fuse=Missing, etc. In the preferred embodiment, the system automatically defines some facts for the user based on the attribute definition. Facts for truth and list attributes, which have a well defined set of possible values, are automatically defined. Numeric attributes require additional user input to define facts, since the range of possible values is much larger. In the preferred embodiment of the present invention, the user may also define more complex facts for list attributes than those defined by the system. Values in list attributes are connected by the logical or "|" for single value list attributes and by the logical and "&" for multiple value list attributes.

Referring now to FIG. 5, the steps for creating a fact in the preferred embodiment of the present invention will now be explained. In the "Component" window 510 the user selects the component from which a fact is to be defined. This causes the name and attributes of the component to be displayed. The user then selects the "View" menu choice 530 in the "Component" window menu bar 540. This causes the view menu to be displayed. The user then selects the "Fact View" selection causing the "Fact" window 800, shown in FIG. 8, to be displayed. In the "Fact" window 800 a single line, called the fact box 810, is highlighted. All facts previously created for the selected component display in an area below the box.

The user moves the cursor to the "Attributes" window 600 and selects the attribute for which a fact is to be defined by clicking on the numbered selector button associated with the attribute. The attribute appears selected and its possible values display in the "Value" window. When the user clicks on the numbered selector for the attribute a second time, the attribute name appears in the fact box 810 under the word "ATTRIBUTE" 820 and the buttons in the "Fact" window 800 which pertain to the attribute become active.

Figure 8:
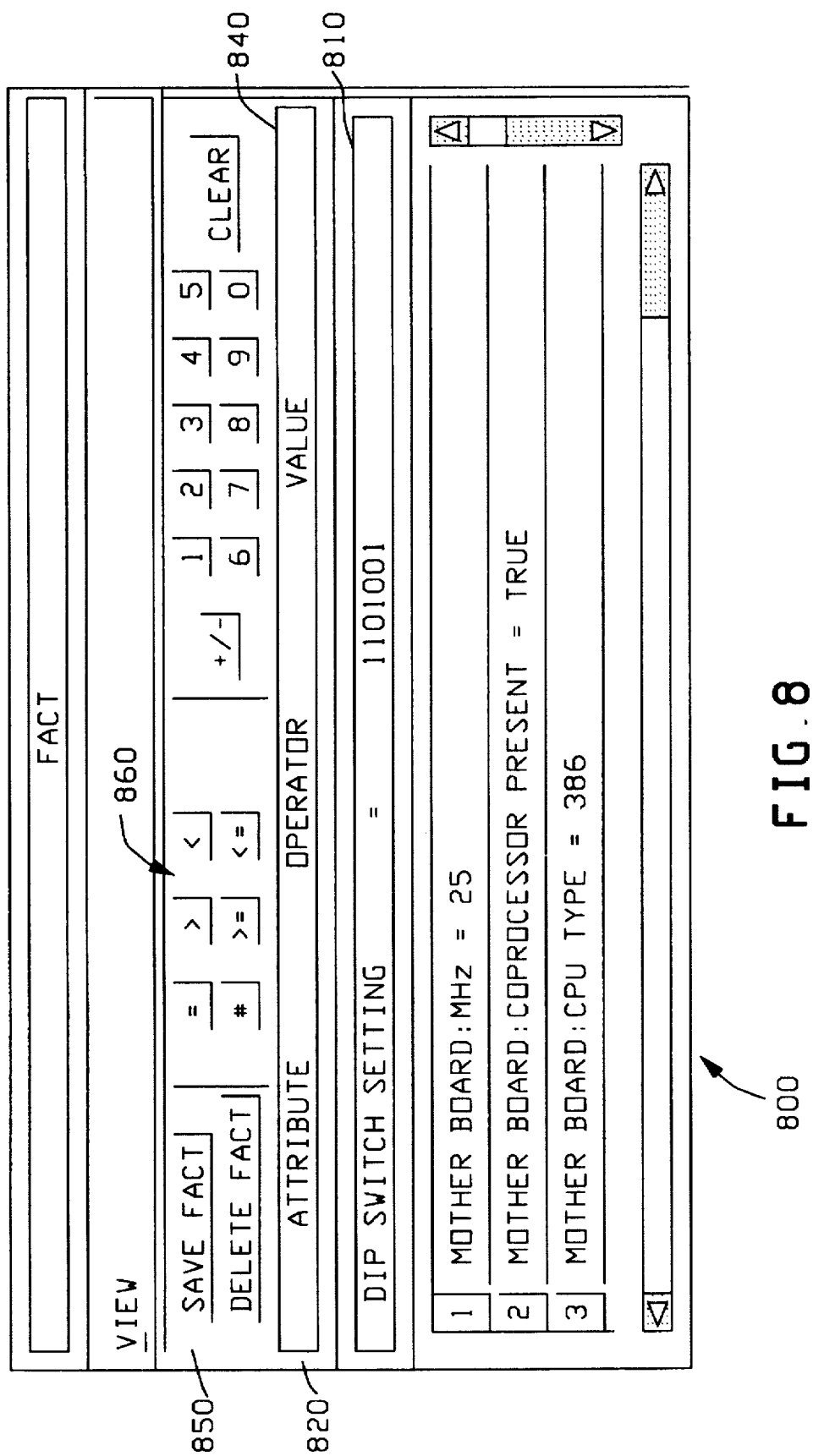
FIG. 8 shows the "Fact" window for the preferred embodiment of the present invention.

The user now selects the operator for the fact under construction by selecting one of the active operator buttons 860 with the cursor. The operator chosen appears in the fact box 810 under the word operator 830. In FIG. 8 the attribute shown is "Dip Switch Setting" and the operator shown is the equal sign.

Depending upon the type of the attribute, the possible attribute values may be automatically displayed, as in the case of a list or truth type, or they may need to be explicitly entered by the user, as in the case of a numeric type. To enter a list or truth type attribute value, the user selects one of the possible values displayed for that attribute and that value is then displayed under the word "Value" 840 in the fact box 810.

When the fact under construction is complete, the user selects the "Save Fact" button 850 and the fact appears below the fact box 810 as a valid fact associated with the given component.

Facts that are created using components located in the component library may be reused in other procedures within the same domain. Facts may not be reused in a domain different from the one in which the component and fact were created in the preferred embodiment.

Having defined one or more facts, a user may now define a formula. Moving the cursor to the decision tree window 440 of FIG. 4, the user selects the leg for which a formula is to be defined. This causes the leg to be highlighted and the contents of the "Path" window 900, shown in FIG. 9, to be displayed.

Figure 9:
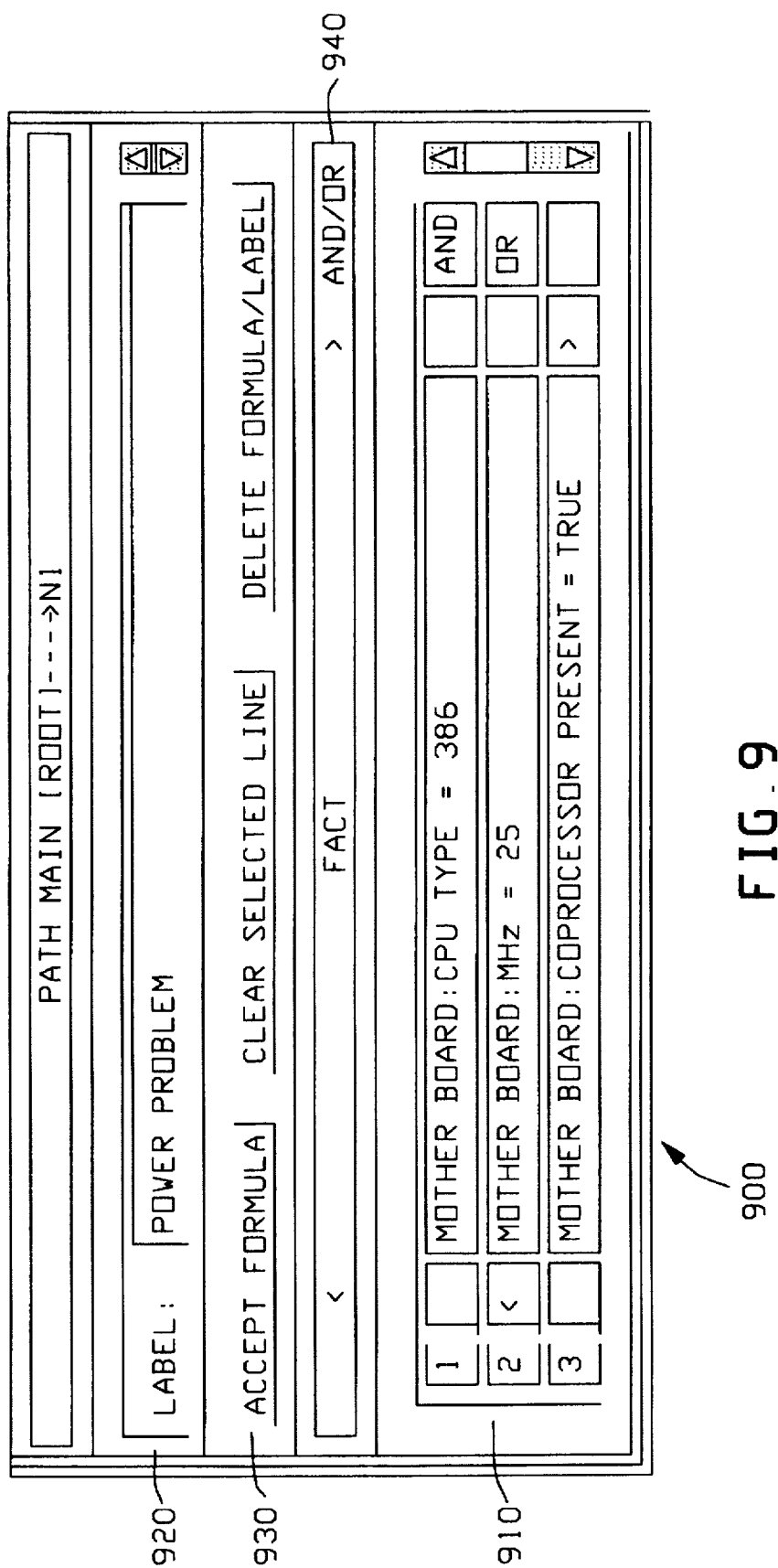
FIG. 9 depicts the "Path" window of the preferred embodiment of the present invention.

The user moves the cursor to the "Path" window 900 shown in FIG. 9 and selects line 1 by clicking on the numbered selector 910, causing the line to be highlighted. The user then moves the cursor to the "Fact" window 800 and selects a fact in a similar manner. This causes the fact to be displayed in the selected line in the "Path" window 900. If the user is defining a multiple fact formula, the user moves the cursor to the AND/OR field 940 and clicks until the appropriate connector AND or OR displays on the selected line. The user may also use parentheses to define the precedence of operators in the formula.

Figure 4:
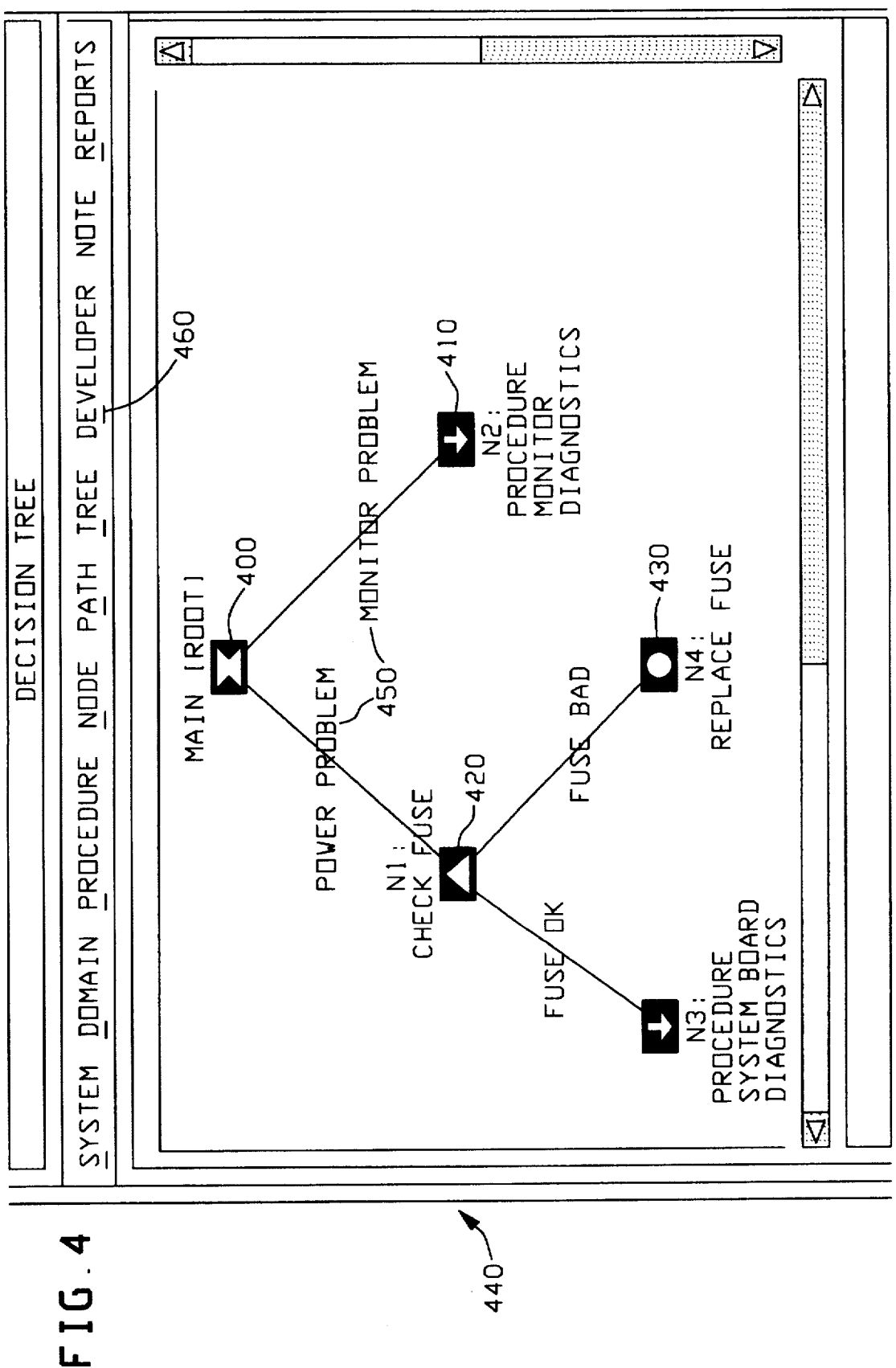
FIG. 4 depicts an expanded version of a decision tree in the "Decision Tree" window of the preferred embodiment of the present invention.

Next the user moves the cursor in the "Path" window 900 and enters a label in the path label box 920. As depicted in FIG. 4, when the return key is pressed to enter the label, the label appears on the path leg 450 in the "Decision Tree" window 440. To complete the creation of the formula and its association with the path leg, the user selects the "Accept Formula" button 930.

In the preferred embodiment, a path label describes the path leg between two nodes in the "Decision Tree" window 440. For example, the two path legs 450 leading from node 400 in FIG. 4 are labeled "Power Problem" and "Monitor Problem", which describe the conclusions derived from a response to a question as to whether a power light is on or not. Labeling path legs permits a user to quickly identify the logic for path legs.

In the preferred embodiment of the present invention, attachments are used to assist the user, or the knowledge base author, by providing information about the construction or use of the knowledge base. Attachments provide information about nodes, components, attributes, and values and may comprise user prompts, user help, electronic documentation, or developer's notes.

A user prompt is a statement or question that the end user sees when employing the finished knowledge base. User prompts are how the finished system communicates with the user. By creating prompts that are clear and concise, one enables the user to quickly understand the statement and return an informed response. The following Table 1 shows the objects with which an attachment may be associated in the preferred embodiment.

TABLE 1

| Attachment | Node | Path | Component | Attribute | Value |
|---|---|---|---|---|---|
| User Prompt | No | No | Yes | Yes | List Value |
| User Help | No | No | Yes | Yes | Only |
| Electronic Documents | Yes | No | Yes | Yes | Yes |
| Explanation Note | Yes | No | No | No | No |

A user prompt may give instructions to the user on what actions to perform, as well as solicit a response to a question. For example, the following might be an appropriate user prompt:

"Run the printer self-test and compare the displayed configuration with the correct configuration. Did the printing occur during the self-test?"

Figure 11:
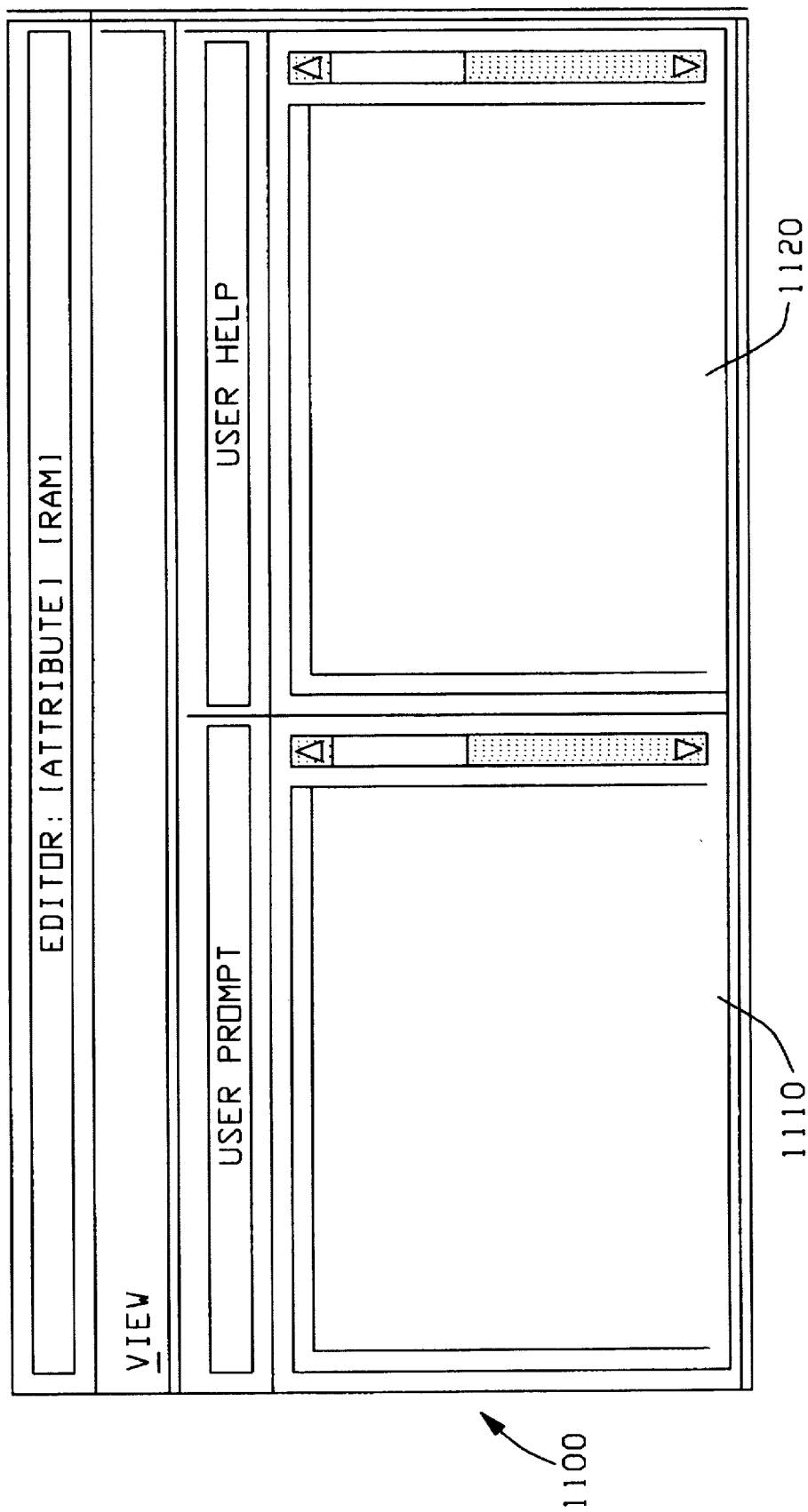
FIG. 11 illustrates the "Prompt/Help" window employed in the preferred embodiment of the present invention.

To create a user prompt and attach it to an object, the user selects the component, attribute, or value with which a prompt is to be associated by clicking the selector to the left of the object. Next the user moves the cursor to the "Editor"

window 1100, shown in FIG. 11, and selects the "View" menu choice, causing the view menu to be displayed. Selecting the "User Prompt/Help" choice causes the "User Prompt" 1110 and "User Help" 1120 windows to display as shown in FIG. 11. The user may then move the cursor to the user prompt portion of the window 1110 and type the user prompt.

In the preferred embodiment, user help may also be associated with the user prompt. User help provides the user additional information about a given user prompt. This context-sensitive help further assists, clarifies, or explains what is expected of the user. User help may be attached in a manner similar to that of attaching user prompts via the "User Help" window 1120 shown in FIG. 11.

Another type of attachment is called an explanation note. An explanation note may be attached to a node. When attached to a solution node, the explanation note contains a brief statement about the problem that was diagnosed. For example, "Turn the power switch to the on position" is an example of a simple explanation note. An explanation note is displayed when the user reaches a solution node in the decision tree. The text displayed in a node may both explain the source of the problem (for instance, main fuse has blown), as well as provide instructions on how to correct the problem. In the preferred embodiment, detailed, corrective information may also be attached to the node via an electronic document attachment.

In the preferred embodiment, another type of attachment is an electronic document attachment. Electronic documentation refers to product information that has been formatted for online access and display. Electronic documents provide the user with more detailed information and explanation than a knowledge base author can easily provide by creating user prompts or context-sensitive help.

The preferred embodiment of the present invention also includes a facility called developer's notes to embed comments in the knowledge base information similar to comments in source code. Developer's notes are internal comments that serve as program documentation about the design, development and authoring of a decision tree employed to construct the knowledge base in the present invention. Developer notes provide information that explains, instructs, and clarifies the inner-workings of a decision tree. Developer notes may also assist the knowledge author when reusing or changing an existing knowledge base.

Developer notes are attached to a component by selecting the component and then selecting the "Developer Note" menu choice 460 from the "Decision Tree" window 440 menu bar of FIG. 4. This causes a "Developer Note" window to display in which the user may enter the notes as appropriate. A similar process is followed to attach a developer's note to other elements such as to a domain, procedure, node, path leg, attribute, or value.

The preferred embodiment of the present invention includes a tool to reduce the turnaround time for a knowledge base author to determine whether the decision tree they have constructed is appropriate for its intended use. This tool is a "Preview" window 550, shown in FIG. 5, which is used to show how statements and questions will appear to the user without having to actually compile a knowledge base from the decision tree. The "Preview" window may be used at any time while defining components, attributes, values, and facts. In this way the author can be confident that the presentation of the resulting expert system will be as desired without repeatedly generating and compiling the knowledge base.

Knowledge base generation refers to transforming the information defined in the decision tree into a set of knowledge base rules that an expert system may use to solve a problem. When a knowledge base is generated, code is created from the node, path leg, component, attribute, value, fact, and formula definitions that the user defined, as well as the structure of the decision trees making up the domain.

In the preferred embodiment of the present invention, the system creates rules for all the procedures within a single domain to generate a knowledge base. Therefore, all procedures linked directly or indirectly to the main procedure in this domain must be completed before attempting code generation or an error will result. The system of the present invention checks all definitions employed in a decision tree to validate their correctness before attempting to generate code.

The steps a user must take to initiate the generation of a knowledge base in the preferred embodiment will now be described. After loading the domain to be used in the generation, the user chooses the "Knowledge Base" menu selection 470 from the "Decision Tree" window menu bar causing the knowledge base menu to appear. The user then selects the "Generate Knowledge Base" menu selection which typically causes a watch icon to be displayed to inform the user that there will be a delay while the system verifies the decision trees in the domain.

If the decision trees are verified as errorless, the watch icon disappears and the "Knowledge Author" window appears as shown in FIG. 22. This window permits the author to include contact information with the knowledge base generated. Selecting the "Accept" button 2210 causes a watch icon to appear while the knowledge base code is generated. The user may then proceed to test or otherwise employ the knowledge base.

However, if the knowledge base generation encountered any errors, an "Error/Warning Message" window appears which lists these errors as shown in FIG. 12. This list may be employed to correct the errors quickly for another generation attempt.

Figure 14A:
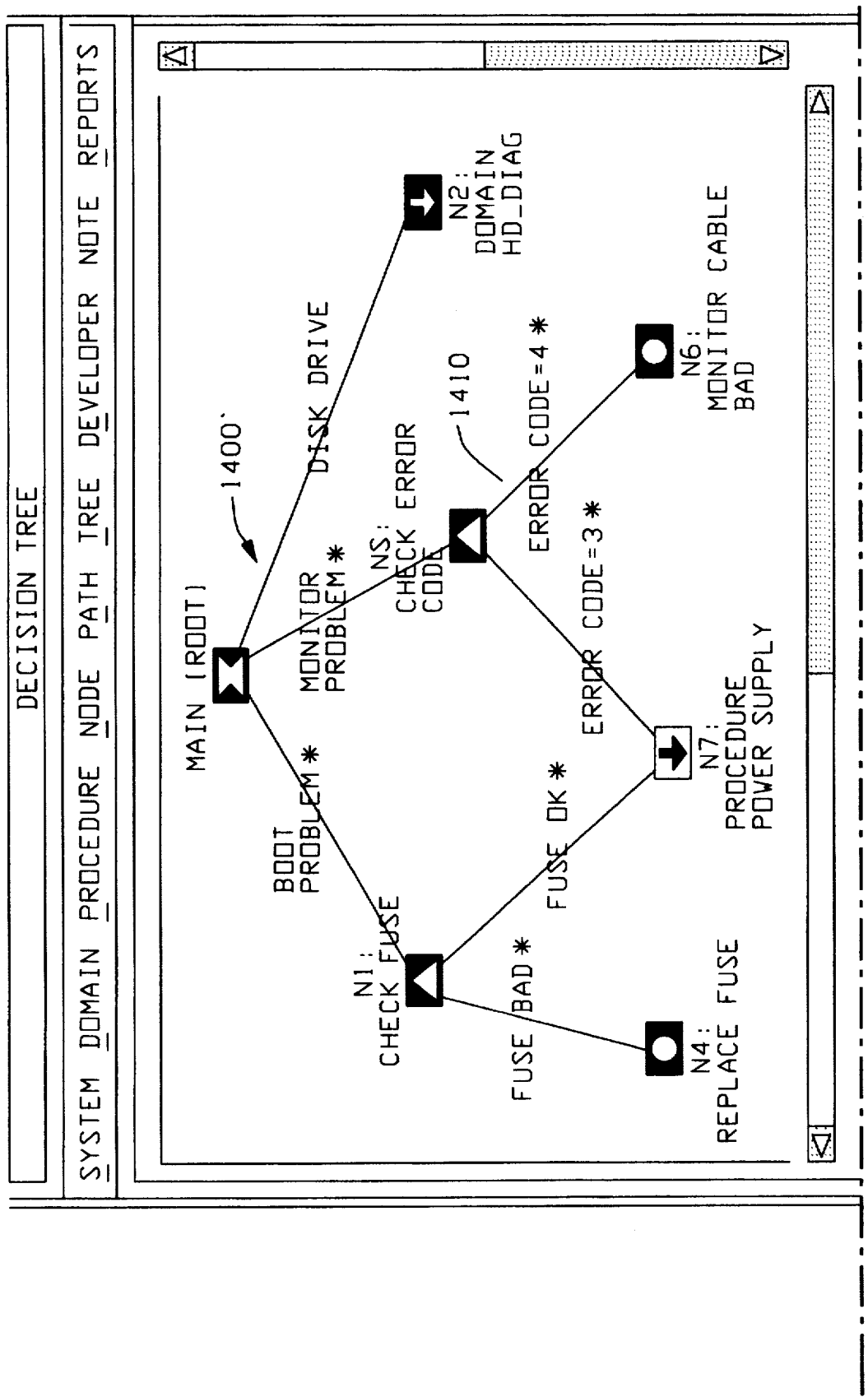
FIG. 14 shows an example of a logical tree created with the preferred embodiment of the present invention.

Having shown the preferred embodiment implementation of the subject invention for a user to construct a decision tree, a description of the implementation of the invention to convert the decision tree to a knowledge base will now be provided with reference to FIG. 14 and a logical tree 1400. The system of the present invention traces the path legs of the tree to each of the solution nodes. For each solution node, the formula for each of the path legs to arrive at that node are combined into a rule for that solution node.

For instance, with reference to the decision tree 1400, to yield the solution at node N6, the result at the root node is that the problem is a monitor problem and the result at node N5 is that the error code=4. The solution at N6 advises the user that the monitor cable is bad. The code generated by the present invention for this path to node N6 1410 is:

if Problem=Monitor and Error Code=4 then Monitor Cable Bad

The system yields expert system code in the correct syntax for the given knowledge engineering language in use. The example shown depicts the logic generated and is not in an actual artificial intelligence language syntax as would be used in an implementation of the present invention.

Figure 15:
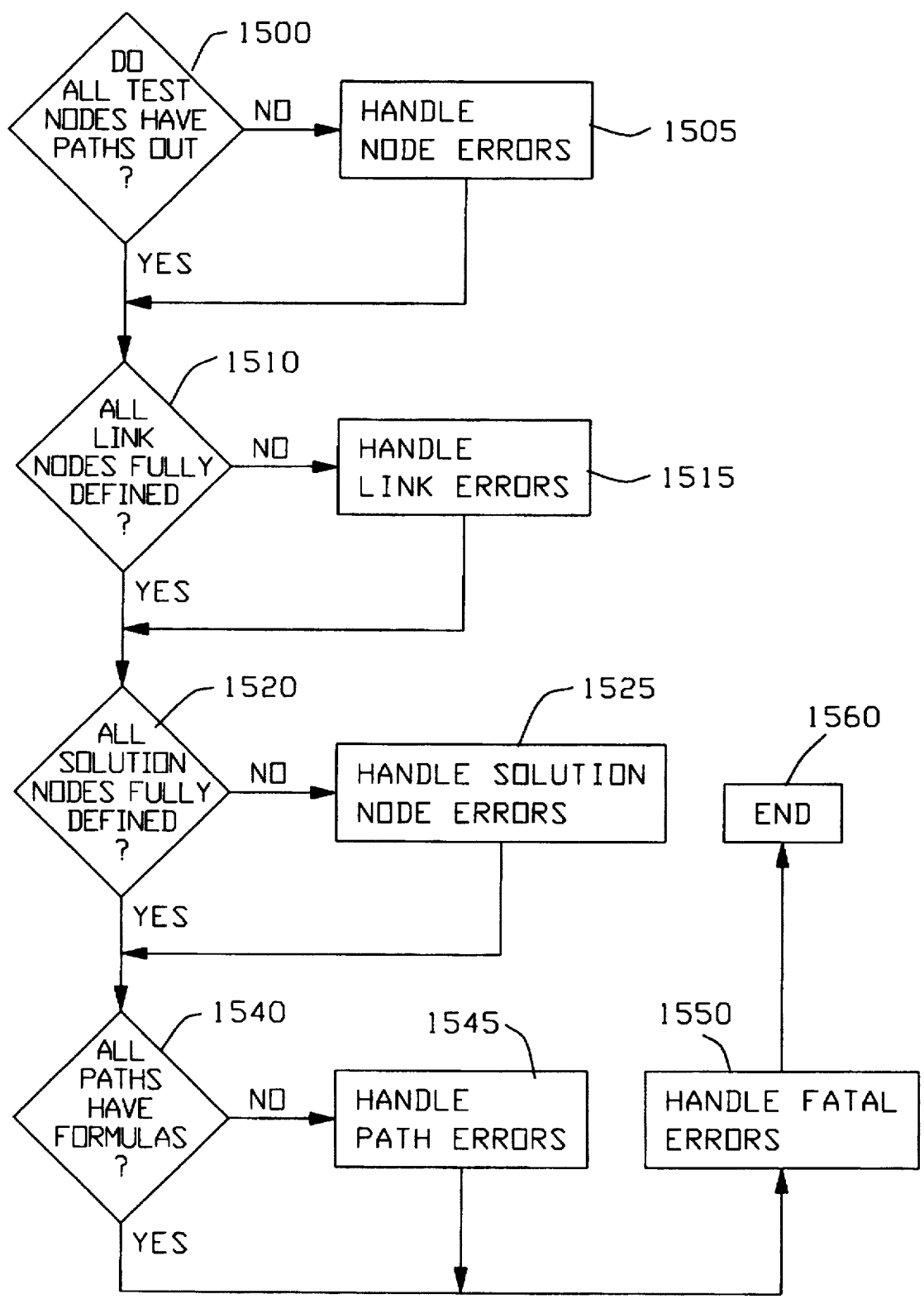
FIG. 15 illustrates the steps employed to verify the correctness of a logical tree built by the user employing the preferred embodiment of the present invention.

The process for generating the code in the present invention will now be discussed with reference to FIG. 15. The system of the present invention first examines the logical tree built by the user to verify it is correct which involves the following checks in the preferred embodiment. First, determine that all test nodes have the appropriate number of path legs out 1500. If they do not, the identity of each node which is not properly connected is noted 1505.

Next, the link nodes are examined 1510 to determine that they link properly to another procedure or domain. If not, again the error is noted 1515.

All solution nodes are examined to verify that solution text is associated with each 1520. If any solution is lacking solution text, it is noted as an error 1525.

Having verified all nodes are fully defined, the path legs connecting them are now checked 1540 to determine that each path leg has a formula. If not, it is handled as an error 1545. If they are all correct, then the result of each of the previous steps is checked 1550 to determine if the tree as a whole is correct or at least is suitable for code generation. Errors noted during the above steps are handled at this time. This completes the verification of the tree construction 1560.

Figure 16:
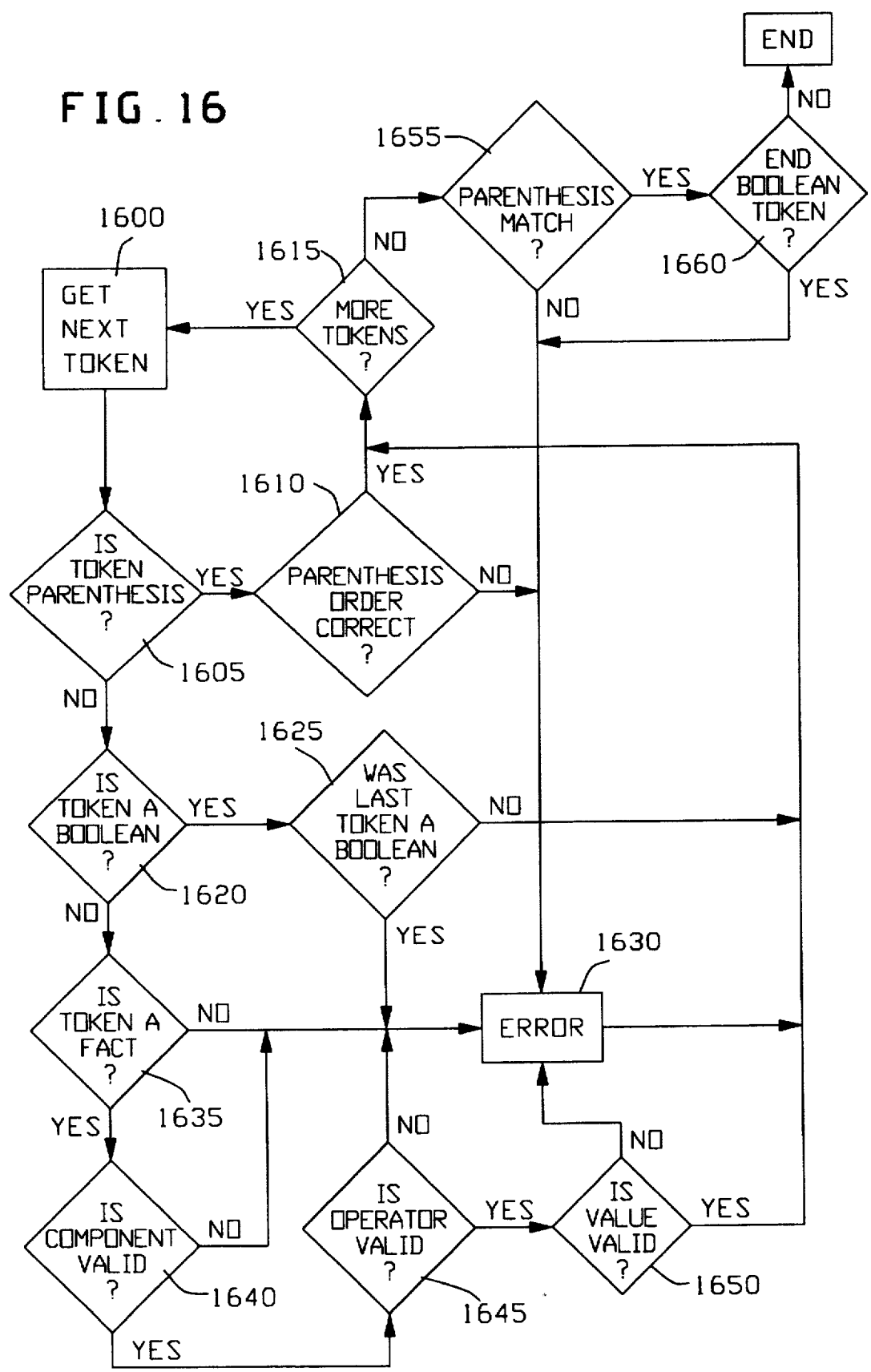
FIG. 16 shows the steps employed to verify the correctness of the formula associated with each of the path legs of a logical tree in the present invention.

Referring to FIG. 16, the system of the present invention verifies the formula associated with each of the path legs. Each leg has already been determined to have a formula. Each formula is now examined for proper construction including syntax and proper attributes. Each formula was constructed by the user using the formula window and was converted to a series of tokens upon entry in the formula window. The use of tokens permits the formula to be more easily analyzed by the system.

The first token of the formula being examined is retrieved 1600 and checked 1605 to determine if it is a parenthesis. If so, the correctness of the parenthesis ordering must be verified 1610. In the preferred embodiment this involves counting the number of left parenthesis tokens and right parenthesis tokens and also verifying their occurrences such that a valid formula is found to exist. If the parenthesis ordering or number is found to be in error, it is noted and displayed to the user. Having checked the parenthesis ordering, a check is performed to determine if more tokens exist for the formula 1615. If so, the process returns to step 1600 to fetch the next token.

If this token is not a parenthesis, the token is checked to determine if it is a boolean logic token 1620. If so, a check is done 1625 to determine if the previous token was also a boolean logic token. If so, this is an error 1630 which is reported to the user later on. If the last token was not a boolean logic token, then the occurrence of this boolean logic token is noted for the next pass through the logic and the process returns to step 1615 to check for more tokens.

If at step 1620 the token is not a boolean logic token, the next step 1635 is to determine if this is a fact token. If not, an error is noted 1630 since only these three types of tokens are expected in the preferred embodiment of the present invention. Other tokens may be included in this analysis which would not make the failure of this token to be a fact token to be in error.

If it is a fact token, a check is done to determine if the component used in the formula is valid 1640. The component must have been created previously, most likely with the component window, to be valid. If it is not valid, an error is noted 1630.

If the component is valid, the operator used is checked 1645. This must have been previously created, most likely with the formula window so that only valid operators should have been employed. If there is an error, it is reported 1630.

If the operator is valid, a check of the value to which the component is to be compared is performed 1650. The value must be valid for the attributes of a given component when created with the component attribute window. Any error is noted 1630. The process continues by checking for more tokens at step 1615.

Alternatively, whenever an error is encountered during the checking of a formula, the processing of the tokens could be immeadiately ended rather than continuing.

When no more tokens are available, a check is performed to determine if all parentheses match 1655. If not, an error is noted 1630. A check is also performed 1660 to determine if the last toekn handled was a boolean. If so, that is an error 1630. After these checks are performed, the checking of the given formula is complete. Each of the formula is checked in this way so that when code generation is attempted, the code is generated correctly the first time.

Figure 17:
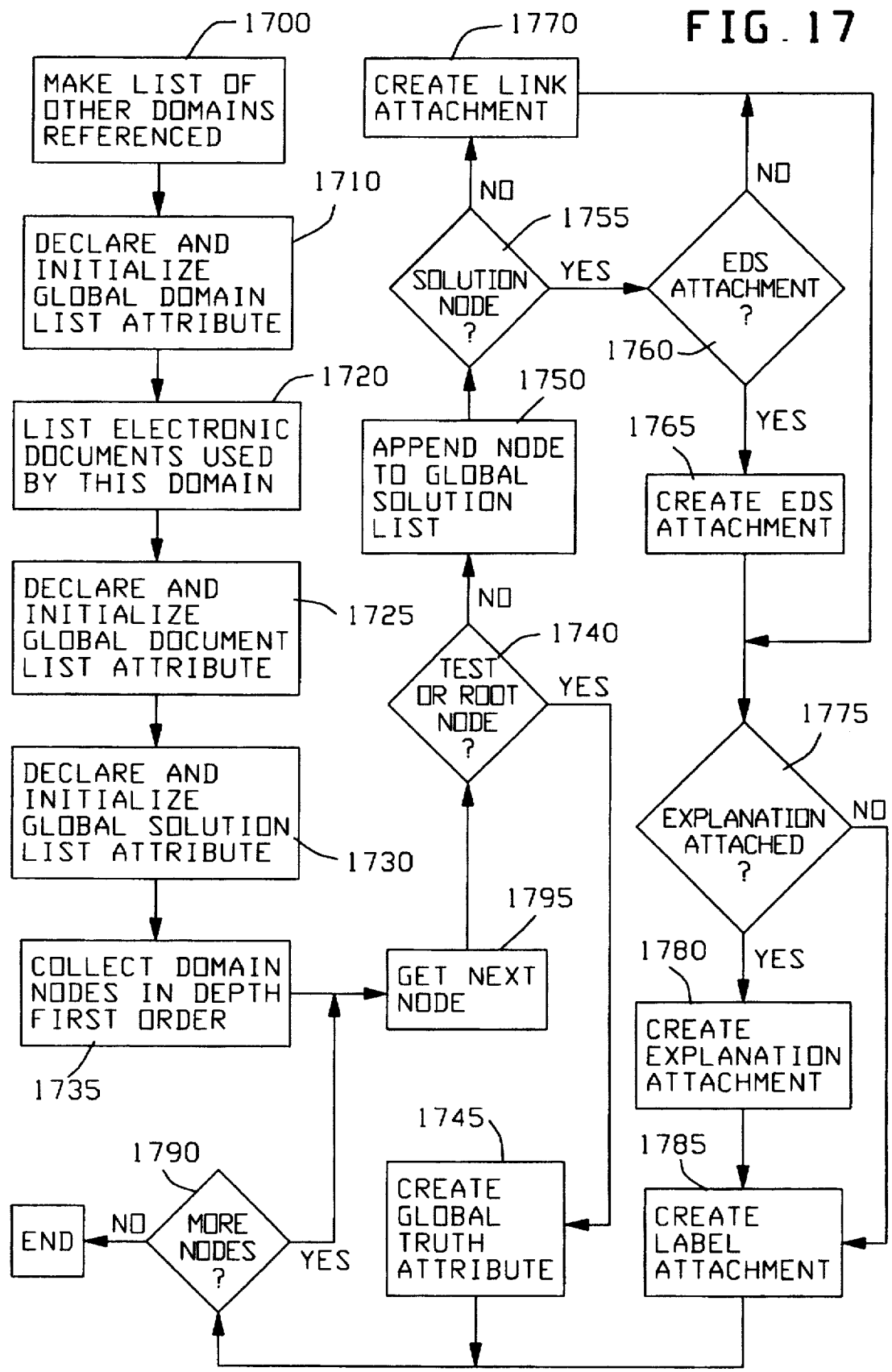
FIG. 17 depicts the steps employed to generate global attributes during the process of code generation in the preferred embodiment of the present invention.

Referring to FIG. 17, the process of code generation begins by generating the appropriate set of global attributes. The first step is to make a list of other domains referenced 1700 by the present domain. This list is later used by the knowledge base execution program to verify that all related knowledge bases are present on the user's system. A domain list attribute is declared in knowledge base code 1710 and initialized with the values of the domain attributes from step 1700.

Next, a list of the electronic documents used is compiled 1720. In the preferred embodiment, electronic documents may be referenced by components, attributes, values, and solution nodes. This list is later used by the knowledge base execution program to verify that all related electronic document files are present on the user's system. A document list attribute is declared in the knowledge base code 1725 and initialized to the values of the electronic documents from the previous step.

A global solution list attribute is declared 1730 which is later initialized to a list of possible values for each solution node and domain link node in the domain. When the knowledge base is executed, the global solution list attribute accumulates a value each time a solution or domain link node is reached.

All nodes employed in this domain are now collected 1735 in a depth first search order. A depth first search of the decision tree begins at the root node of the Main procedure and proceeds downward until all solution nodes have been reached. When a procedure link node is encountered, the search continues at the root node of the procedure to which the node is linked.

Figure 19:
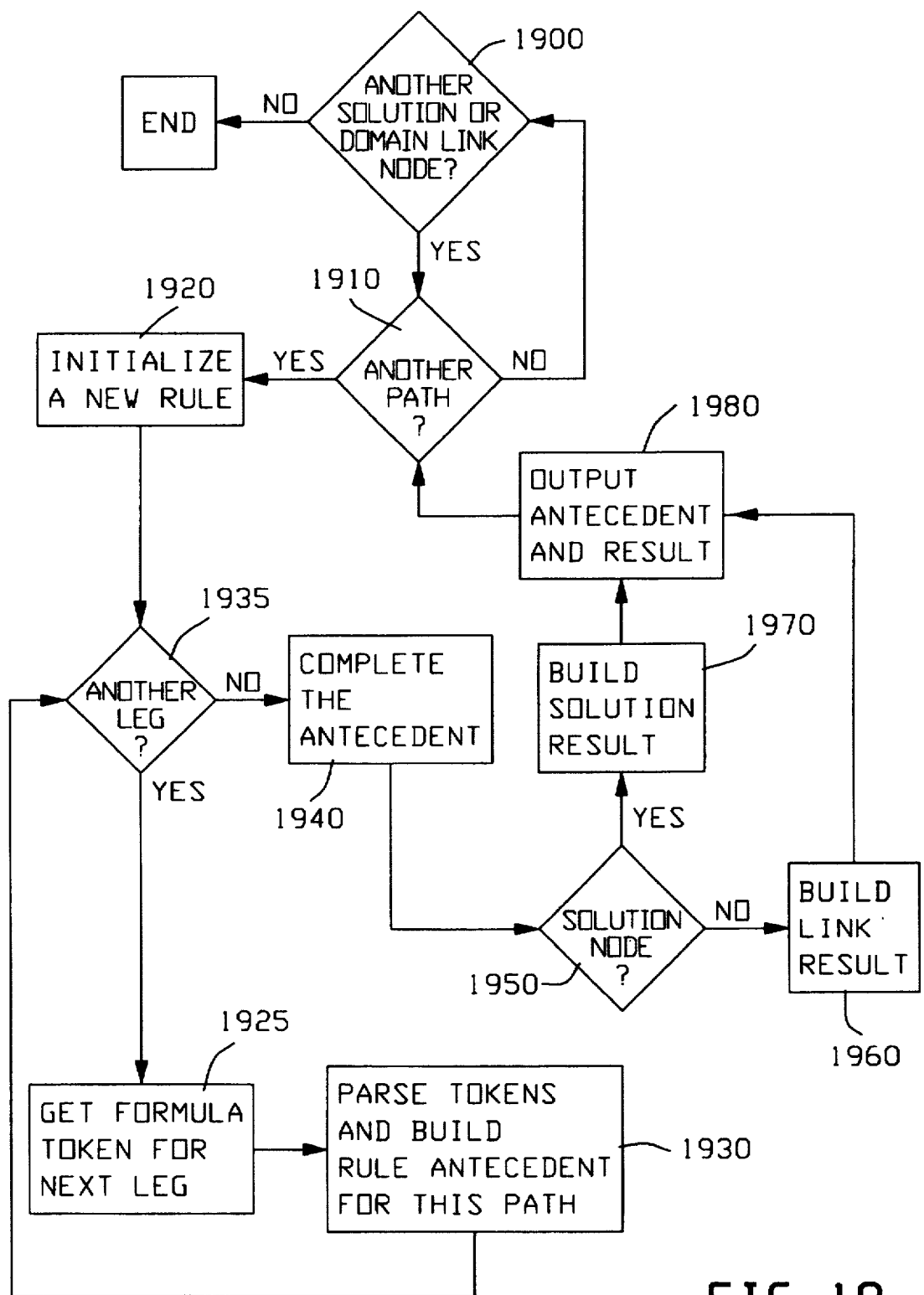
FIG. 19 depicts the steps employed for one method of generating the rules and results during the process of code generation in the preferred embodiment of the present invention.
Figure 20:
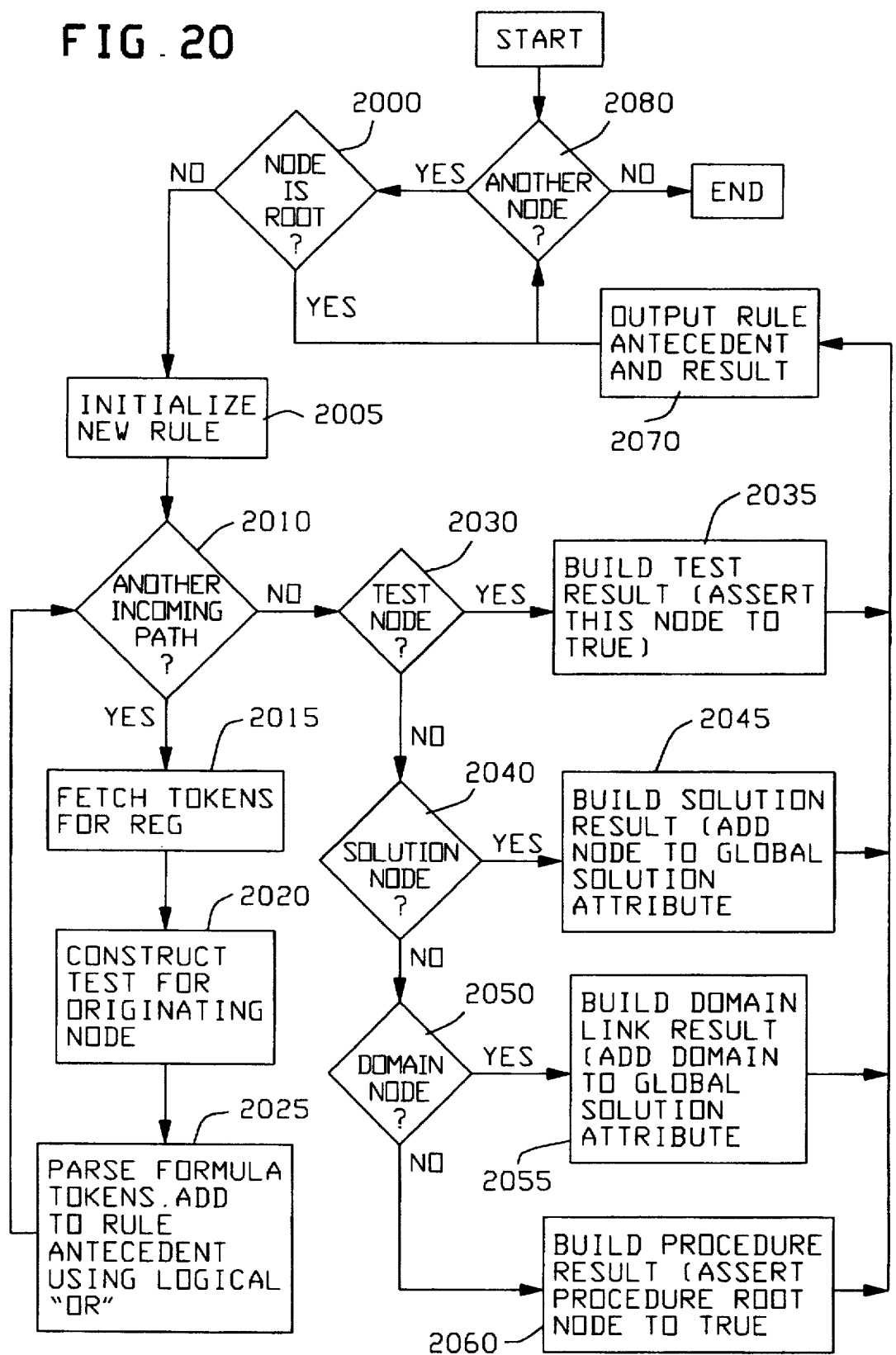
FIG. 20 depicts the steps employed a second method of generating the rules and results during the process of code generation in the preferred embodiment of the present invention.

Beginning at the first node in the list 1795, a node is examined to determine if it is a test or root node 1740. If so, a global truth attribute is declared and initialized for the node 1745 if the code generation method shown in FIG. 20 is employed. If the rule generation method described by FIG. 19 is employed, step 1745 may be skipped. In either case, processing continues at step 1795 to get the next node.

If the node is not a test or root node 1740, in the preferred embodiment it must be a domain link or solution node and a value for this node is appended to the global solution list 1750. A check is performed to determine if this node is a solution node 1755. If so, a check is performed to determine if an electronic document is associated with the node 1760 and, if so, an EDS attachment is created for the node 1765.

If the node is determined to be a domain link node at step 1755, then a link attachment is create for the node value 1770.

During the creation of solution list values, a check is performed to determine if an explanation note is attached to the node 1775 and, if so, an explanation note attachment is created for the node value 1780. For solution list values, a label attachment is created 1785 to complete the node value creation.

When the given node value for the solution list attribute is completed for the current node, a check is performed to determine if another node exists for which a value has not yet been created 790. If so, the process returns to step 1795. When values have been created for all nodes, the process ends.

Having generated a set of global attributes for the knowledge base, the system of the present invention now creates classes for the knowledge base. As discussed earlier, these classes are defined by the attributes and possible values associated with each component employed in the logical tree.

Figure 18:
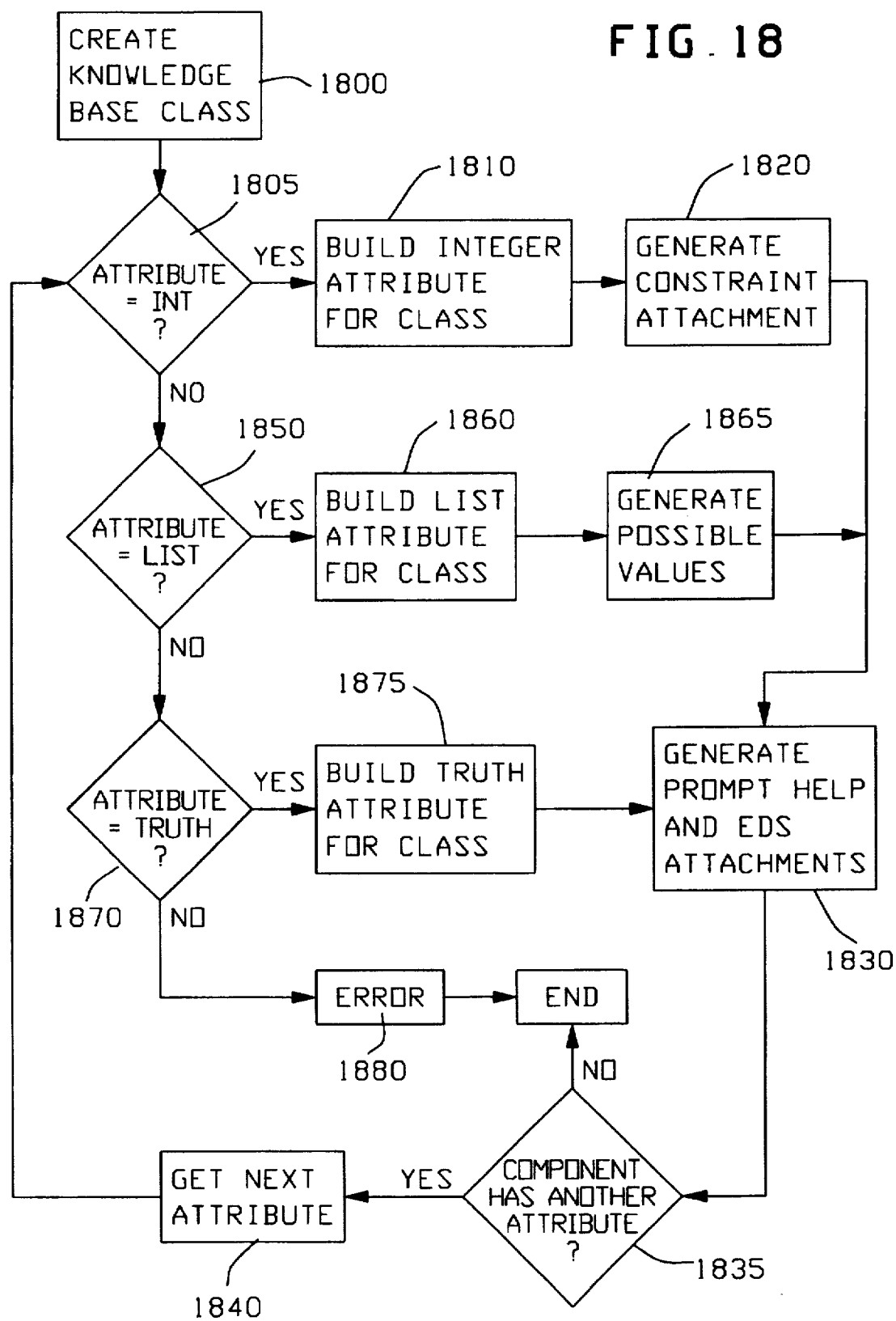
FIG. 18 depicts the steps employed to generate components during the process of code generation in the preferred embodiment of the present invention.

In the preferred embodiment of the present invention, each component employed in the tree is processed one at a time as shown in FIG. 18. This process begins by creating the corresponding knowledge base class 1800 and then determining the type of attributes in use. For each attribute of the current component, a comparison is made 1805 to determine if the attribute is an integer. If so, an integer attribute string is built 1810 which is appropriate for the classes employed by the code of the given knowledge base.

Any constraints associated with the integer are then generated 1820. The form of these constraints is determined by the user when the component was created and by the knowledge base code employed in the system in use. For an integer in the preferred embodiment, this constraint may be ">", "<", ">=", "<=", "=", or "!=", as appropriate.

Next, any attachments associated with the integer are generated 1830. Attachments may include a prompt to the user and user help as appropriate, as well as any electronic documentation associated with the node. The construction of the integer attribute is complete and check is performed to determine if more attributes exist for this component 1835. If so, the next attribute is retrieved 1840 and processing returns to step 1805. The processing of the component is complete when all attributes associated with the component have been processed.

If the check at step 1805 determined that the attribute was not an integer, the attribute is then checked to see if it is a list type 1850. If so, a list attribute string is built 1860 and the possible values previously specified by the user are generated 1865. As mentioned previously, a list attribute may be defined to permit either a single value or multiple values. Next, any attachments associated with the attribute are generated and attached 1830 and the list attribute is complete. Processing continues at step 1835 to check for additional attributes.

If at step 1850 the attribute is not a list attribute, a check is performed 1870 to determine if the attribute is a truth attribute. Any attachments associated with the attribute are also generated 1830 to complete the truth attribute processing and a check is performed to determined if there are additional attributes to handle 1835.

If the component was none of the above types, an error has occurred 1880 since these are the only attribute types supported in the preferred embodiment of the present invention. However, those of skill in the art will recognize that other types of attributes, such as a real attribute and string attribute, may be included within the scope of the present invention.

Given a complete set of classes and global attributes, a valid set of rules may now be generated for the knowledge base. One method employed by the system of the present invention starts at the main procedure root node and goes through each of the paths in the logic tree to reach every solution and domain link node to generate a rule for each complete set of paths as shown in FIG. 19. A single solution or domain link node may have several unique paths leading to it from the main procedure root node. The nodes for each of the decision trees to be processed have been gathered by the depth-first search performed at step 1735 of FIG. 17 in the process of global attribute generation.

Beginning with the first solution node set of paths, a check is performed to find the next solution or domain link node to process 1900. Beginning with that node, a check is done to find the first path to that node to process 1910 and the new rule is initialized 1920. This may involve resetting variables used to track the number of paths employed and clearing any variable used to build a string to prepare for the new rule.

A check is done to see if another leg in the path exists 1935 and, if so, the formula tokens for the next leg in the path are retrieved 1925. As mentioned earlier, the formula for each leg in the path is stored as a series of tokens. The tokens for this leg are then parsed and used to construct a portion of the rule antecedent for this path 1930. This process of parsing and rule construction is detailed in the discussion of FIG. 21.

When all tokens for the path leg have been handled, the process returns to step 1935 to check for another leg in the path.

When all legs in the path have been handled, the rule antecedent for the path may be completely constructed 1940 by appending the appropriate syntax to the formula built. In the preferred embodiment of the present invention, this involves appending an "if" at the beginning of the rule, a "then" at the end, and includes appropriate syntax for the knowledge base code.

Once the rule antecedent is constructed, a check is performed to determine if the node at the end of the path is a solution node 1950. If not, the node is a link node and a link result is built 1960 for the result of the rule under construction. If the node is a solution node, then a solution result is built 1970 for the rule result. In either case the code is constructed as appropriate for knowledge base.

The completed rule antecedent and result are output to the knowledge base file 1980 completing the construction for that path. This process returns to step 1910 to determine if there is another path from the root node to the solution or domain link node to process. If not, the process returns to step 1900 to determine if other solution or domain link nodes exist in the tree. If not, the process of rule generation is complete.

The above described process of rule generation will be recognized to have several variations which are still be within the contemplated scope of the present invention. For instance, an alternative method of rule generation for the present invention involves the constructing a separate rule for each node in the tree and appending this rule with an evaluation indicating whether the nodes which are antecedent to the current node evaluated to true.

In the method shown in FIG. 20, each rule antecedent part is a set of expressions concatenated by logical "OR"s. Contrast this with the method of FIG. 19 where each rule antecedent is a set of expressions concatenated by logical "AND"s. For the process of FIG. 20, each expression is associated with a path leg leading into the node to which the rule corresponds. Since each incoming path leg originates at another node, a path leg expression comprises a test to see if the originating node is true logically "AND"ed with a test to see if the path leg formula is true.

For each node that is not a root node 2000, a new rule is initialized 2005. This may involve resetting variables used to track the node employed and clearing any variable used to build a string to prepare for the new rule.

Beginning with the first incoming path leg to the current node 2010, the rule tokens for the leg are retrieved 2015. As mentioned earlier, the formula for each leg in the path is stored as a series of tokens. A test is constructed for the originating node for this leg to verify that the originating node evaluated to true. The tokens for this leg are then parsed and used to construct a portion of the test for the rule antecedent 2025 and appended to the test for the originating node using a logical "OR". This process of parsing and formula construction is further detailed in the discussion of FIG. 21.

The process continues to return to step 2010 to handle all incoming legs to the node in this manner. When all incoming legs have been handled, the type of this node must be determined. If the node is a test node 2030, a test result for this node is built 2035 to assert that this node is true. If the node is a solution node 2040, a solution result is built 2045 and the node is added to the global solution list attribute.

If the node is a domain link node 2050, a domain link result is built 2055. Otherwise, in the preferred embodiment, the node is a procedure node so a procedure result is built 2060 and an assertion is made that the global attributes corresponding to the root node for the linked procedure is true.

Whatever the type of node, the rule and any associated output are written to the knowledge base file 2070 completing the construction of that rule. This process continues 2080 to determine if another node exists in the tree. If so, the process returns to step 2000. When a rule has been generated for all nodes, the process of rule generation is complete.

An example of the rule generation under this later method is shown below. The rules were generated based upon the logic tree depicted in FIG. 14. A listing of the entire actual knowledge base code generated by the preferred embodiment of the present invention for this example is found in Appendix A.

Sample Rules:

```
Main_N1 Rule:
  if Problem = Boot
    then Main_N1 = true.
Main_N4 Rule
  if Main_N1 and Fuse = Bad
    then add Main_N4 to solution.
Main_N7 Rule:
  if (Main_N1 and Fuse = OK) or (Main_N5 and
  Error Code = 3)
    then PowerSupply_Root = true.
PowerSupply_N1 Rule:
  if PowerSupply_Root and Self Test = Good
    then add PowerSupply_N1 to solution.
PowerSupply_N2 Rule:
  if (PowerSupply_Root and Self Test = Bad)
    then add PowerSupply_N2 to solution.
Main_N5 Rule:
  if Problem = Monitor
```

-continued

```
    then Main_N5 = true.
Main_N6 Rule:
  if (Main_N5 and ErrorCode = 4)
    then add Main_N6 to solution.
Main_N2 Rule:
  if Problem = Disk Drive
    then add Main_N2 to solution.
```

Figure 21:
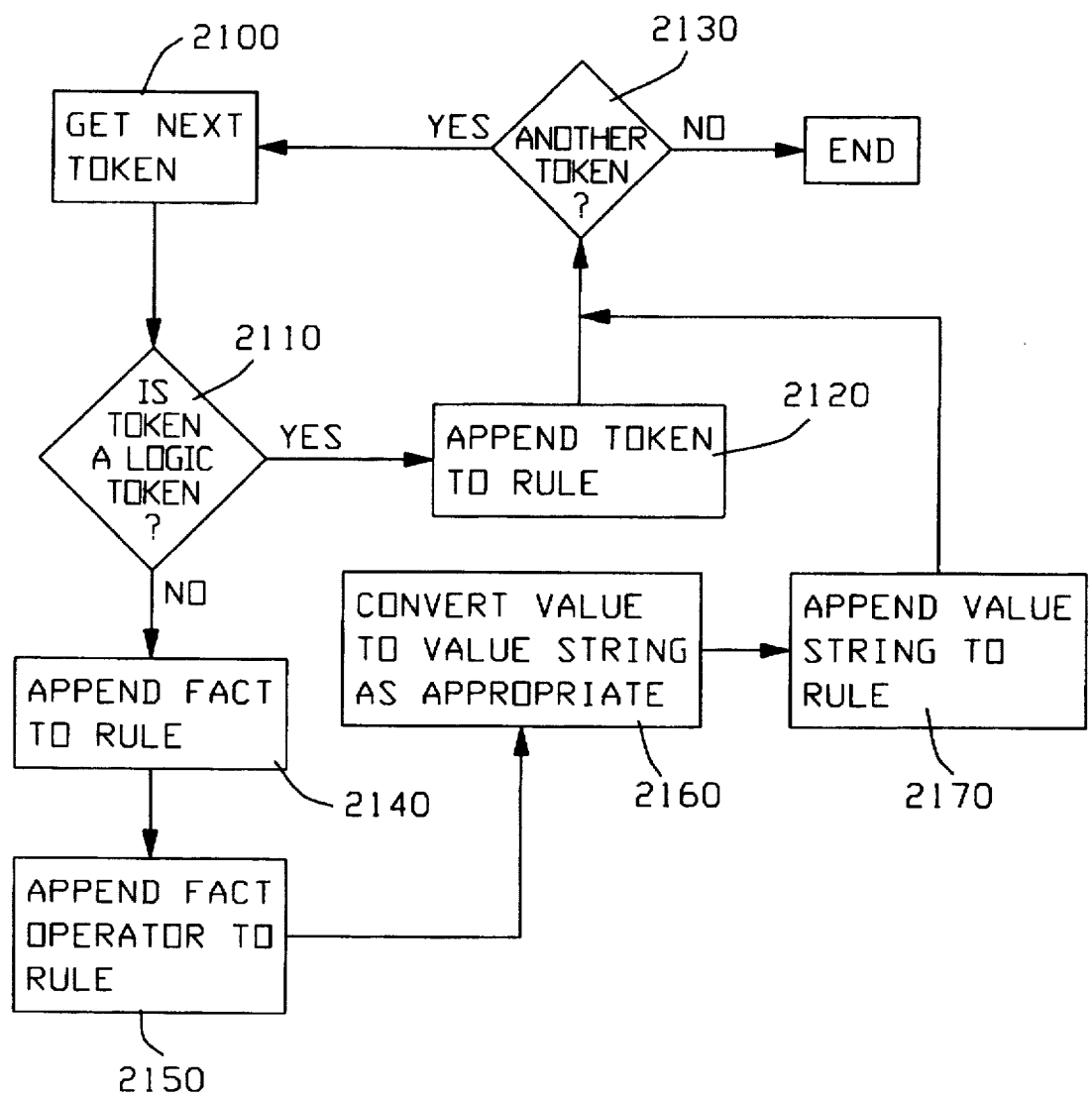
FIG. 21 shows the process of parsing and formula construction used in the process of code generation in the preferred embodiment of the present invention.

With reference now to FIG. 21, the process of parsing the formula tokens for use in constructing a knowledge base rule will be described. The next token in the set of tokens to be examined is acquired at step 2100. A check is done to determine if this token is a logic token 2110. If so, the token is appended to the rule under construction 2120 in the appropriate form for the code of the knowledge base employed.

A check is done to see if another token exists for this formula 2130. If so, the process returns to step 2100 where the next token is retrieved. If a check at 2110 determines that the token is not a logic token, then the token must be a fact token in the preferred embodiment of the present invention. This is true since all formula in the tree have been verified for correct construction previous to the code generation stage.

The fact is appended to the rule under construction 2140 and the fact operator is appended to the rule 2150 in a manner appropriate for the knowledge base code in use.

The attribute value is converted as appropriate to a value string 2160 depending on whether it is a list, truth, or numeric type. The value string is then appended to the rule under construction 2170.

Having handled the fact token the process returns to step 2130 to determine if another token exists for this path leg as described earlier.

Some of the many advantages of the present invention should now be readily apparent. For example, a novel system and method has been provided which is capable of generating error free code for a knowledge base which is produced from the construction of a logic tree by a user. The knowledge base may be generated by a user who is not familiar with artificial intelligence principles or programming generally, but is knowledgeable in the area of expertise for which the knowledge base is to be constructed. In this way, correct error free code can be generated the first time by one who is not an experienced programmer.

Obviously, many modifications and variations of the present invention are possible in light of the above teachings. It is therefore to be understood that the foregoing embodiments are presented by way of example only and that within the scope of the claims attached hereto the invention may be practiced other than as specifically described.

Appendix A

```
\ This is an expert system automatically generated by the KAS tool
\     KAS- Knowledge Authoring System
\         a product of Unisys Corporation.
\     KAS Release 2.1a
\
\ KAS knowledge bases are generated for use with/under the
\ the Unisys Service Architecture expert system tool
\ Service Advisor Knowledgebases are generated to operate under
\ the following Unisys released/development products.
\         KES --version 3.0 and following on PC/UNIX
\     and  SNAP - Strategic Networked Application Platform
\             --version 4.0a and following on PC/UNIX
\
\ This source file is the Knowledge Base for
\       DOMAIN [SAMPLE, Version 2]
\       ------------------------------- attributes:     \ ----- beginning of GLOBAL attributes ------
  KAS_VER_NO: str[default:"2.1"].
  KAS_VER_EXT: str[default:"a"].
  KB_NAME: str[default:"SAMPLE"].
  KB_CHECKPOINT: str[default:"2"].
  KAS_AUTHOR: str[default:"John Doe"]
    {ADDRESS: "Malvern Development Center"}
    {PHONE: "215-555-5555"}.
  DOMAIN_LINKS: list of str[default:
    "HD_DIAG","SYSBOARD"].
  EDS_LINKS: list of str[default:
    "PC_IT"].
  Main_N1: truth[default:false].
  PROC5_ROOT: truth[default:false].
  Main_N5: truth[default:false].
  solution: mlt (
    Solution_1
      {LABEL: "Replace Fuse"}
          (EDS: "PC_IT","Removing System Unit Cover  12-1"}
      (explain: "The behavior you are experiencing is being caused by a bad fuse. Click on electr
onic documentation to see diagrams and instructions for replacing the fuse.  Once the fuse is rep
laced, restart computer and run diagnostics."}
    ,
    Link_2
      {LABEL: "SYSBOARD"}
      {LINK: "SYSBOARD"}
      (explain: "This domain contains dignostic routines for the system subboard."}
    ,
    Solution_3
      (LABEL: "Replace Power Supply"}
      (explain: "The Power Supply is faulty and needs to be replaced."}
```

```
    Solution_4
      {LABEL: "Monitor Cable Bad"}
      {explain: "The monitor cable is either loose, unconnected or faulty.\nCheck the connection
and reboot your machine.\nIf you still experience the same problem, replace the cable."}
    ,
    Link_5
      {LABEL: "HardDrive Diagnostics"}
      {LINK: "HD_DIAG"}
      {explain: "This domain contains PC Hard Drive Diagnostic routines."}

). \ ----- End of solution mlt -----
% \ ----- End of GLOBAL attributes   ----- classes: \-----     beginning of classes    -----

C_Power_Supply : [default: Mem1]
  attributes:
    A_Self_Test : sgl (
        V_Good
          {question: "Good"}

,
        V_Bad
          {question: "Bad"}

)   \----end of List attribute:A_Self_Test
          {question: "Self Test"}

%
  endclass
    {question: "For Power Supply,"}

\ ----- end of class: C_Power_Supply -----

C_System : [default: Mem1]
  attributes:
    A_Problem_Type : sgl (
        V_Boot
          {question: "Boot"}

,
        V_Disk_Drive
          {question: "Disk Drive"}

,
        V_Monitor
          {question: "Monitor"}

)   \----end of List attribute:A_Problem_Type
          {question: "Problem Type"}
```

```
       A_Fuse_OK : truth
           {question: "Fuse OK"}

%
   endclass
     {question: "For System,"}

\ ----- end of class: C_System -----

C_Monitor : [default: Mem1]
   attributes:
     A_Error_Code : sgl (
          V_1
            {question: "1"}

V_2
            {question: "2"}

V_3
            {question: "3"}

V_4
            {question: "4"}

V_5
            {question: "5"}

)   \----end of List attribute:A_Error_Code
            {question: "Error Code"}

%
   endclass
     {question: "For Monitor,"}

\ ----- end of class: C_Monitor -----

% \ ----- end of classes ----- rules:   \ -----beginning of rules-----
```

```
R1:
if
  C_System:Mem1>A_Problem_Type  = V_Boot
then
  Main_N1 = true.
endif.

R2:
if
  (Main_N1 and
  C_System:Mem1>A_Fuse_OK  = false)
then
  reassert solution = solution & Solution_1.
endif.

R3:
if
  (Main_N1 and
  C_System:Mem1>A_Fuse_OK  = true)
  or
  (Main_N5 and
  C_Monitor:Mem1>A_Error_Code  = V_3)
then
  PROC5_ROOT = true.
endif.

R4:
if
  (PROC5_ROOT and
  C_Power_Supply:Mem1>A_Self_Test  = V_Good)
then
  reassert solution = solution & Link_2.
endif.

R5:
```

```
if
  (PROC5_ROOT and
  C_Power_Supply:Mem1>A_Self_Test  = V_Bad)
then
  reassert solution = solution & Solution_3.
endif.

R6:
if
  C_System:Mem1>A_Problem_Type  = V_Monitor
then
  Main_N5 = true.
endif.

R7:
if
  (Main_N5 and
  C_Monitor:Mem1>A_Error_Code  = V_4)
then
  reassert solution = solution & Solution_4.
endif.

R8:
if
  C_System:Mem1>A_Problem_Type  = V_Disk_Drive
then
  reassert solution = solution & Link_5.
endif.

Z \ ----- end of rules ----- actions:     \ ----- actions section ----
  obtain solution.Z
```

What is claimed:

1. A system including a computer and a display means for constructing a logical tree having at least one non-disjunctive branch and displaying a graphical representation of said logical tree for use in automatically generating a knowledge base in a computer comprising:
   a) node generation means for generating a node in said tree wherein a graphical representation of said node is displayed on said display means;
   b) type definition means for defining the type of said node wherein permissible node types include a test node type and a solution node type;
   c) test definition means for defining a test associated with said test node type node;
   d) solution definition means for defining a solution associated with said solution node type node;
   e) leg definition means for defining a leg associated with two nodes wherein a graphical representation of said leg may be displayed on said display means; and
   f) formula definition means for defining a formula associated with said leg.

2. The system of claim 1 which further comprises:
   g) component generation means for generating components for use in creating results and tests.

3. The system of claim 2 wherein said components are defined as a plurality of attributes wherein said plurality of attributes includes an integer type, a truth type, and a list type.

4. A method for automatically generating a knowledge base in a computer from a graphical representation of a logical tree having at least one non-disjunctive branch, comprising the steps of:
   a) verifying the organization of said logical tree;
   b) verifying the content of said logical tree;
   c) generating a plurality of global attributes;
   d) creating a plurality of classes; and
   e) creating a plurality of rules as defined by said tree using said plurality of global attributes and said plurality of classes, wherein said rules are executable by an inference engine in a backward chaining mode;
   wherein said step of verifying the content of said tree comprises the steps of:
     b1) verifying that a valid formula is associated with each said leg;
     b2) verifying that a valid test is associated with each said test node;
     b3) verifying that a valid solution is associated with each solution node; and
     b4) verifying that each link node in said logical tree is linked to either a procedure or to a domain.

5. The method of claim 4 further including the step
   f) generating links to electronic documents referenced by said knowledge base.

6. The method of claim 4 wherein said step of verifying the organization of said logical tree comprises the steps of:
   a1) verifying that each test node in said logical tree has at least one leg leading out of said test node; and
   a2) verifying that each leg in said logical tree is connected to two and only two nodes wherein at least one of said two nodes is a test node.

7. The method of claim 4 wherein said step of generating said plurality of global attributes comprises the steps of:
   c1) determining the identity of domains referenced by the present domain; and c2) creating a domain list attribute wherein said domains determined in step c1 are possible values for said domain list attribute.

8. The method of claim 7 wherein said step of generating said plurality of global attributes comprises the steps of:
   c3) identifying a plurality of solution nodes in a present domain; and
   c4) creating a solution list attribute wherein said solution nodes identified in step c3 are possible values for said solution list attribute.

9. The method of claim 8 wherein said step of generating said plurality of global attributes comprises the steps of:
   c5) identifying a plurality of test nodes in a present domain; and
   c6) creating a truth attribute for each test node identified in step c5.

10. The method of claim 4 wherein said step of creating said plurality of classes includes the step of:
    d1) creating a class for a component in a present domain based upon attributes of said component and possible values associated with said attributes.

11. The method of claim 4 wherein said step of creating a plurality of rules comprises the steps of:
    e1) determining the identity of a path beginning with a root test node and ending at a solution node wherein said path comprises a plurality of path legs and a plurality of test nodes;
    e2) generating a first boolean evaluation statement for a given knowledge base language employing a formula associated with a first leg of said path;
    e3) determining if there is another leg in said path;
    e4) generating a second boolean evaluation statement for the given knowledge base language employing a formula associated with a next leg of said path if another leg was determined to exist in step e3;
    e5) concatenating said second boolean evaluation statement with said first boolean evaluation statement using a logical connector to form a new first boolean evaluation statement if another leg was determined to exist in step e3;
    e6) repeating steps e3, e4, and e5 until it is determine in step e3 that there is not another said test node and said leg in said path;
    e7) formatting a solution associated with said solution node as appropriate for the given knowledge base language; and
    e8) writing said first boolean evaluation statement and said formatted solution to said knowledge base.

12. The method of claim 11 which further includes the step of:
    e9) verifying that said boolean evaluation statement comprises a valid combination of valid components, operators, facts, and attributes.

13. The method of claim 4 wherein said step of creating a plurality of rules comprises the steps of:
    e1) starting with a first node of an ordered node list, identifying a left-most path leg leading into said first node;
    e2) identifying the node from which the left-most path leg identified in step e1 originates;
    e3) if the first node is a solution node, formatting a rule consequent by adding this node to a global solution attribute list;
    e4) if the first node is a domain link node, formatting the rule consequent by adding this node to the global solution attribute list;

e5) if the first node is a procedure link node, formatting the rule consequent by asserting a global truth attribute associated with the root node of the linked procedure to true;

e6) if the first node is a test node, formatting the rule consequent by asserting the global truth attribute associated with this node to true;

e7) formatting a Boolean expression in the knowledge base language based on a formula found at the current path leg, wherein this expression is made a part of a rule antecedent;

e8) determining if the node from which this path originates is the root node and, if not, formatting a Boolean expression to test the global truth attribute associated with the originating node, wherein this expression is made a part of the rule antecedent, and concatenating the node and path Boolean expressions with a logical AND;

e9) repeating steps e1 through e8 for each path leading into the first node and, each time a path is processed, concatenating the resulting expression to the rule antecedent with a logical OR; and e10) generating a knowledge base language rule using the formatted rule antecedent and the rule consequent.

14. The method of claim 13 which further includes the step of:

e11) repeating the steps recited in claim 30 for every node in the ordered node list.

15. A method for automatically generating a knowledge base in a computer from a graphical representation of a logical tree having at least one non-disjunctive branch, comprising the steps of:

a) verifying the organization of said logical tree;

b) verifying the content of said logical tree;

c) generating a plurality of global attributes;

d) creating a plurality of classes; and e) creating a plurality of rules as defined by said tree using said plurality of global attributes and said plurality of classes, wherein said rules are executable by an inference engine in a backward chaining mode;

wherein said step of creating a plurality of rules comprises the steps of:

e1) starting with a first node of an ordered node list, identifying a left-most path leg leading into said first node;

e2) identifying the node from which the left-most path leg identified in step e1 originates;

e3) if the first node is a solution node, formatting a rule consequent by adding this node to a global solution attribute list;

e4) if the first node is a domain link node, formatting the rule consequent by adding this node to the global solution attribute list;

e5) if the first node is a procedure link node, formatting the rule consequent by asserting a global truth attribute associated with the root node of the linked procedure to true;

e6) if the first node is a test node, formatting the rule consequent by asserting the global truth attribute associated with this node to true;

e7) formatting a Boolean expression in the knowledge base language based on a formula found at the current path leg, wherein this expression is made a part of a rule antecedent;

e8) determining if the node from which this path originates is the root node and, if not, formatting a Boolean expression to test the global truth attribute associated with the originating node, wherein this expression is made a part of the rule antecedent, and concatenating the node and path Boolean expressions with a logical AND;

e9) repeating steps e1 through e8 for each path leading into the first node and, each time a path is processed, concatenating the resulting expression to the rule antecedent with a logical OR; and e10) generating a knowledge base language rule using the formatted rule antecedent and the rule consequent.

16. The method of claim 15 further including the step of:

f) generating links to electronic documents referenced by said knowledge base.

17. The method of claim 15 wherein said step of verifying the organization of said logical tree comprises the steps of:

a1) verifying that each test node in said logical tree has at least one leg leading out of said test node; and a2) verifying that each leg in said logical tree is connected to two and only two nodes wherein at least one of said two nodes is a test node.

18. The method of claim 15 wherein said step of generating said plurality of global attributes comprises the steps of:

c1) determining the identity of domains referenced by the present domain; and c2) creating a domain list attribute wherein said domains determined in step c1 are possible values for said domain list attribute.

19. The method of claim 18 wherein said step of generating said plurality of global attributes comprises the steps of:

c3) identifying a plurality of solution nodes in a present domain; and c4) creating a solution list attribute wherein said solution nodes identified in step c3 are possible values for said solution list attribute.

20. The method of claim 19 wherein said step of generating said plurality of global attributes comprises the steps of:

c5) identifying a plurality of test nodes in a present domain; and c6) creating a truth attribute for each test node identified in step c5.

21. The method of claim 15 wherein said step of creating said plurality of classes includes the step of:

d1) creating a class for a component in a present domain based upon attributes of said component and possible values associated with said attributes.

22. The method of claim 15 which further includes the step of:

e11) repeating the steps recited in claim 11 for every node in the ordered node list.

23. The method of claim 15 wherein said step of creating a plurality of rules comprises the steps of:

e11) determining the identity of a path beginning with a root test node and ending at a solution node wherein said path comprises a plurality of path legs and a plurality of test nodes;

e12) generating a first boolean evaluation statement for a given knowledge base language employing a formula associated with a first leg of said path;

e13) determining if there is another leg in said path;

e14) generating a second boolean evaluation statement for the given knowledge base language employing a formula associated with a next leg of said path if another leg was determined to exist in step e3;

e15) concatenating said second boolean evaluation statement with said first boolean evaluation statement using a logical connector to form a new first boolean evaluation statement if another leg was determined to exist in step e3;

e16) repeating steps e3, e4, and e5 until it is determine in step e3 that there is not another said test node and said leg in said path;

e17) formatting a solution associated with said solution node as appropriate for the given knowledge base language; and e16) writing said first boolean evaluation statement and said formatted solution to said knowledge base.

24. The method of claim 23 which further includes the step of:

e19) verifying that said boolean evaluation statement comprises a valid combination of valid components, operators, facts, and attributes.

* * * * *